United States Patent
Kim et al.

(10) Patent No.: US 11,117,990 B2
(45) Date of Patent: Sep. 14, 2021

(54) HOMOPOLYPROPYLENE AND METHOD FOR PREPARING THE SAME

(71) Applicant: LG Chem, Ltd., Seoul (KR)

(72) Inventors: Taejin Kim, Daejeon (KR); Ha Na Park, Daejeon (KR); Seong Min Chae, Daejeon (KR); In Yong Jung, Daejeon (KR); Daeyeon Lee, Daejeon (KR); Jihwa Ye, Daejeon (KR); Heekwang Park, Daejeon (KR)

(73) Assignee: LG Chem, Ltd.

( * ) Notice: Subject to any disclaimer, the term of this patent is extended or adjusted under 35 U.S.C. 154(b) by 112 days.

(21) Appl. No.: 16/491,214

(22) PCT Filed: Dec. 20, 2018

(86) PCT No.: PCT/KR2018/016353
§ 371 (c)(1),
(2) Date: Sep. 5, 2019

(87) PCT Pub. No.: WO2019/132421
PCT Pub. Date: Jul. 4, 2019

(65) Prior Publication Data
US 2020/0031962 A1  Jan. 30, 2020

(30) Foreign Application Priority Data

Dec. 26, 2017 (KR) .................. 10-2017-0180271
Nov. 2, 2018 (KR) .................. 10-2018-0133853

(51) Int. Cl.
*C08F 110/06* (2006.01)
*C08F 4/64* (2006.01)
(Continued)

(52) U.S. Cl.
CPC .......... *C08F 110/06* (2013.01); *D04H 1/4291* (2013.01); *D04H 3/007* (2013.01);
(Continued)

(58) Field of Classification Search
CPC ....... C08F 110/06; C08F 4/61927; C08F 4/64
See application file for complete search history.

(56) References Cited

U.S. PATENT DOCUMENTS 9,382,411 B2 * 7/2016 MacDonald ............... C08J 5/18
9,783,557 B2 * 10/2017 Park ...................... C08F 210/06
(Continued)

FOREIGN PATENT DOCUMENTS

CN    101045758 A    10/2007
CN    105555811 A     5/2016
(Continued)

OTHER PUBLICATIONS

International Search Report from Application No. PCT/KR2018/016353 dated Apr. 9, 2019, 3 pages.
(Continued)

*Primary Examiner* — Rip A Lee
(74) *Attorney, Agent, or Firm* — Lerner, David, Littenberg, Krumholz & Mentlik, LLP

(57) ABSTRACT

A homopolypropylene has i) a molecular weight distribution of less than 2.4; ii) a melt index (measured at 230° C. under a load of 2.16 kg in accordance with ASTM D1238) of 5 to 3000 g/10 min; iii) a remaining stress ratio of 0.5% or less; and iv) a complex viscosity of 5 to 600 Pa·s at an angular frequency of 1 rad/s and a complex viscosity of 5 to 300 Pa·s at an angular frequency of 100 rad/s. A method for preparing the homopolyproylene is also provided. A molded article and a non-woven fabric are also provided.

20 Claims, 4 Drawing Sheets

(51) Int. Cl.
    *C08F 4/76*     (2006.01)
    *D04H 1/4291*     (2012.01)
    *D04H 3/007*     (2012.01)
    *C08F 4/6192*     (2006.01)

(52) U.S. Cl.
    CPC ...... *C08F 4/61927* (2013.01); *C08F 2410/02* (2013.01); *C08F 2420/01* (2013.01); *C08F 2500/03* (2013.01); *C08F 2500/12* (2013.01)

(56) References Cited

U.S. PATENT DOCUMENTS

| | | | |
|---|---|---|---|
| 10,100,183 B2 * | 10/2018 | MacDonald | ............... C08J 5/18 |
| 2001/0044506 A1 | 11/2001 | Mehta et al. | |
| 2005/0239979 A1 | 10/2005 | Schottek et al. | |
| 2006/0160962 A1 | 7/2006 | Tonti et al. | |
| 2007/0142578 A1 | 6/2007 | Marin et al. | |
| 2011/0184134 A1 | 7/2011 | Kolb et al. | |
| 2013/0035442 A1 | 2/2013 | Tsou et al. | |
| 2016/0115258 A1 | 4/2016 | Hafner et al. | |
| 2016/0208028 A1 | 7/2016 | Choi et al. | |
| 2016/0251460 A1 | 9/2016 | Noh et al. | |
| 2016/0257703 A1 | 9/2016 | Park et al. | |
| 2020/0140583 A1 * | 5/2020 | Kim | ..................... C07F 17/00 |
| 2020/0223962 A1 * | 7/2020 | Kim | ..................... C07F 17/00 |
| 2020/0239609 A1 * | 7/2020 | Park | ..................... C08F 110/06 |

FOREIGN PATENT DOCUMENTS

| | | | | |
|---|---|---|---|---|
| JP | 2001163771 A | 6/2001 | | |
| JP | 2007534703 A | 11/2007 | | |
| JP | 2011052029 A | 3/2011 | | |
| JP | 2013518146 A | 5/2013 | | |
| KR | 20060029247 A | 4/2006 | | |
| KR | 20150037653 A | 4/2015 | | |
| KR | 20150058065 A | * 5/2015 | ............. C08F 10/06 |
| KR | 20160011226 A | 1/2016 | | |
| KR | 20160045433 A | 4/2016 | | |
| KR | 20170039504 A | 4/2017 | | |
| WO | 02070572 A2 | 9/2002 | | |
| WO | 2005105863 A2 | 11/2005 | | |
| WO | 2007078387 A1 | 7/2007 | | |
| WO | 2009054833 A2 | 4/2009 | | |
| WO | WO 2009/054833 A1 | * 4/2009 | | |
| WO | 2014088856 A1 | 6/2014 | | |

OTHER PUBLICATIONS

Wente, et al., "Manufacture of Superfine Organic Fibers", Naval Research Laboratories, Chemistry Division, May 25, 1954, 21 pages.

European Search Report Application No. 18897192.3, dated Apr. 2, 2020, p. 1-6.

Search Report from Office Action for Chinese Application No. 201880014302.0 dated Jul. 5, 2021; 3 pages.

* cited by examiner

HOMOPOLYPROPYLENE AND METHOD FOR PREPARING THE SAME

CROSS-REFERENCE TO RELATED APPLICATION(S)

This application is a National Stage Entry under 35 U.S.C. § 371 of International Application No. PCT/KR2018/016353 filed on Dec. 20, 2018 which claims priority to Korean Patent Application No. 10-2017-0180271 filed on Dec. 26, 2017 and Korean Patent Application No. 10-2018-0133853 filed on Nov. 2, 2018, all of which are incorporated by reference.

TECHNICAL FIELD

The present invention relates to a homopolypropylene having improved mechanical characteristics with excellent processability, and a method for preparing the same.

BACKGROUND ART

Olefin polymerization catalyst systems can be classified into Ziegler-Natta and metallocene catalyst systems, and these highly active catalyst systems have been developed in compliance with their characteristics. Ziegler-Natta catalyst has been widely applied to existing commercial processes since it was developed in the 1950's. However, since the Ziegler-Natta catalyst is a multi-active site catalyst in which a plurality of active sites are mixed, it has a feature that molecular weight distribution is broad. Also, since compositional distribution of comonomers is not uniform, there is a problem that it has a limitation to secure the desired physical properties.

Meanwhile, the metallocene catalyst is composed of a main catalyst including a transition metal compound as a main component and an organic metal compound-based cocatalyst including aluminum as a main component. The metallocene catalyst is a homogeneous complex catalyst and a single site catalyst. Due to the characteristics of the metallocene catalyst having a single active site, a polymer prepared by using the metallocene catalyst has a narrow molecular weight distribution and a uniform composition distribution of a comonomer. Further, the properties of polymers such as stereoregularity, copolymerization properties, molecular weight, crystallinity, and the like can be controlled by modifying a ligand structure of the metallocene catalyst and changing polymerization conditions.

A homopolypropylene which is usually produced by using a Ziegler-Natta catalyst has a problem in that when the strength of the homopolypropylene is increased or a basis weight is lowered, the physical properties and the processability are deteriorated. In addition, the homopolypropylene produced by using a Ziegler Natta catalyst has a higher xylene solubles contents than a homopolypropylene produced by using a metallocene catalyst, and has a high content of low molecular weights due to a large molecular weight distribution. Thus, a scrubber which is produced by using the homopolypropylene has a smooth surface property, and is not appropriate for scouring.

In order to solve the problem, a method in which a polypropylene having a melt index (MI) of 230 g/10 min which is conventionally produced by a Ziegler-Natta catalyst is blended with an additive to produce a thick fiber having a rough feel has been suggested. But a polypropylene composition in which the polypropylene produced with the Ziegler-Natta catalyst and the additive are blended had poor spinnability so that a non-uniform fiber is produced, resulting in deterioration of physical properties. In addition, the process including dry blending→thermal processing→pelletizing→second processing→product, has a drawback of causing high processing costs.

In order to make up for the drawback, an attempt to improve processability and mechanical properties of a homopolypropylene by using a metallocene catalyst has been made. However, when a homopolypropylene was produced using a previously developed metallocene catalyst, there was a drawback in that viscosity in processing was so high that processability was not sufficient, or on the contrary, viscosity in processing was sufficient to ensure processability, but strength was deteriorated.

Thus, a homopolypropylene with both improved processability and mechanical properties such as strength has not been properly developed until now.

DETAILED DESCRIPTION OF THE INVENTION

Technical Problem

It is an object of the present invention to provide a homopolypropylene having advantages of good mechanical properties such as high strength together with excellent processability, and a method for preparing the same.

Technical Solution

According to one embodiment of the present invention, a homopolypropylene satisfying the following conditions is provided:

i) a molecular weight distribution of less than 2.4;
ii) a melt index (measured at 230° C. under a load of 2.16 kg in accordance with ASTM D1238) of 5 to 3000 g/10 min;
iii) a remaining stress ratio of 0.5% or less; and
iv) a complex viscosity of 5 to 600 Pa·s at an angular frequency of 1 rad/s and a complex viscosity of 5 to 300 Pas at an angular frequency of 100 rad/s.

According to another embodiment of the present invention, a method for preparing the homopolypropylene is provided, including polymerizing a propylene monomer in the presence of a supported catalyst including a silica carrier, and a compound of the following Chemical Formula 1 and a cocatalyst supported on the silica carrier:

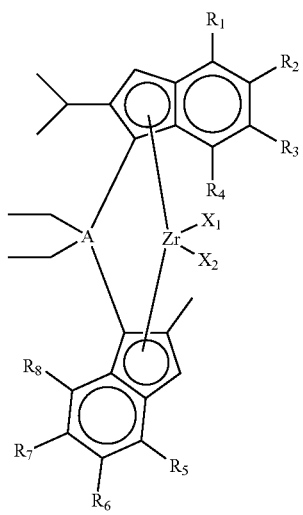

[Chemical Formula 1]

in Chemical Formula 1, $X_1$ and $X_2$ are each independently a halogen, $R_1$ and $R_5$ are each independently a $C_{6-20}$ aryl substituted with a $C_{1-20}$ alkyl, $R_2$ to $R_4$ and $R_6$ to $R_8$ are each independently hydrogen, a halogen, a $C_{1-20}$ alkyl, a $C_{2-20}$ alkenyl, a $C_{1-20}$ alkylsilyl, a $C_{1-20}$ silylalkyl, a $C_{1-20}$ alkoxysilyl, a $C_{1-20}$ ether, a $C_{1-20}$ silylether, a $C_{1-20}$ alkoxy, a $C_{6-20}$ aryl, a $C_{7-20}$ alkylaryl, or a $C_{7-20}$ arylalkyl, and A is carbon, silicon, or germanium.

Further, according to another embodiment of the present invention, a molded article including the homopolypropylene is provided.

Furthermore, according to another embodiment of the present invention, a non-woven fabric including the homopolypropylene, specifically a non-woven fabric for washing such as a scrubber, is provided.

Advantageous Effects

The homopolypropylene according to the present invention which is produced with a specific catalyst and the like, has a high content of long chain branches (LCB) and an appropriate distribution thereof. Thus, the homopolypropylene exhibits improved mechanical properties such as high strength together with excellent processability, and is useful for applications such as various molded articles.

In addition, the homopolypropylene according to the present invention shows excellent fiber processability, thereby allowing production of a fiber having a thin and uniform thickness and production of a non-woven fabric having high rigidity and a low basis weight. In addition, the homopolypropylene according to the present invention exhibits rougher texture than conventional products and excellent toughness so that the fiber is not easily torn even with high strength. Accordingly, the homopolypropylene according to the present invention may be useful for producing a non-woven fabric requiring high surface roughness with high rigidity, particularly a non-woven fabric for washing such as a scrubber.

DETAILED DESCRIPTION OF THE EMBODIMENTS

Figure 1:
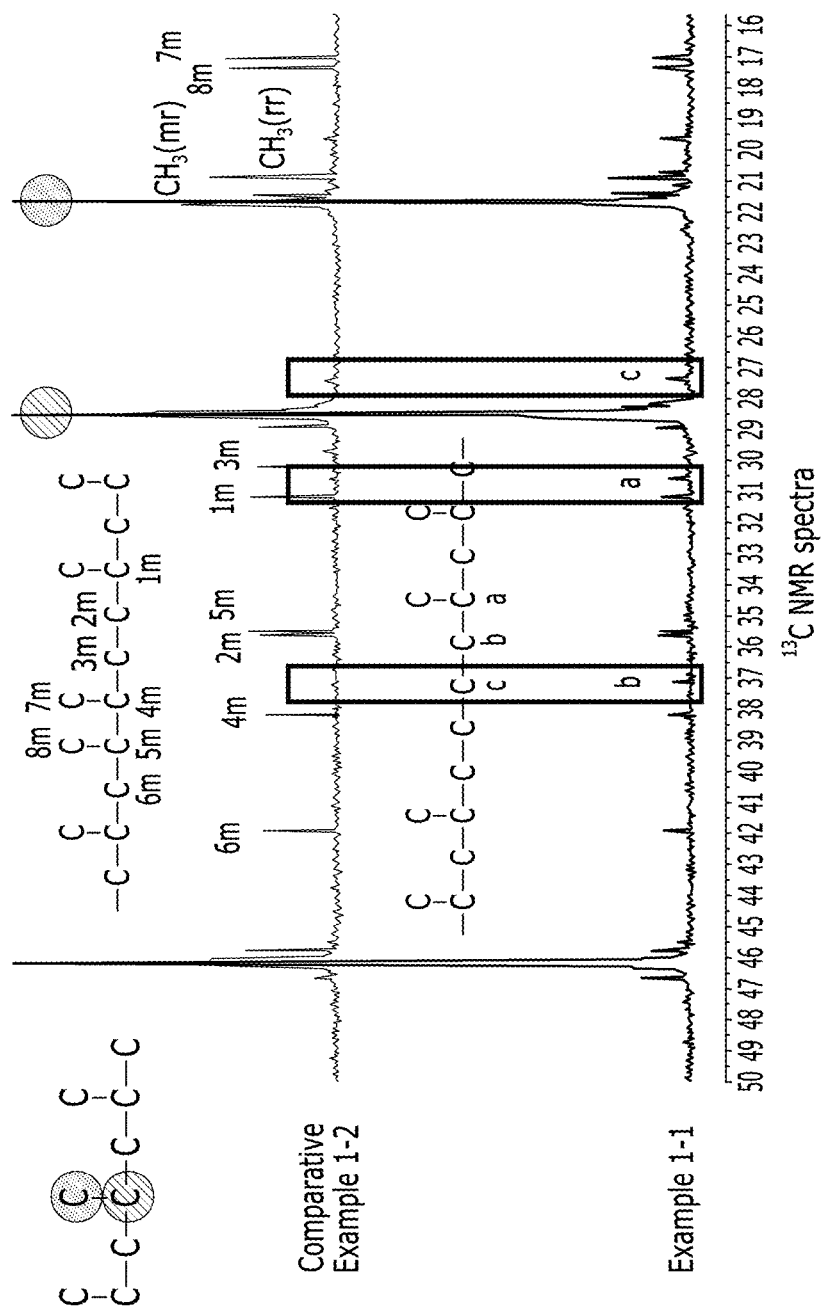
FIG. 1 shows 13C NMR analysis results of homopolypropylenes of Example 1-1 and Comparative Example 1-2, in which it was confirmed that LCB was formed in Example 1-1, unlike Comparative Example 1-2.

The terms used herein are used for only describing exemplary embodiments, and are not to limit the present invention. A singular expression includes a plural expression, unless otherwise implied clearly in the context. In the present specification, it should be understood that the terms such as "comprise", "provided", or "have" are to indicate that implemented features, steps, constituent elements, or combinations thereof are present, but not to exclude in advance that there is a possibility that one or more other features, steps, constituent elements, or combinations thereof are present or additionally present.

The invention can make various modifications and take various forms, and thus specific embodiments are illustrated and described in detail below. It should be understood, however, that the invention is not intended to be limited to any particular disclosed form, but includes all modifications, equivalents, and alternatives falling within the spirit and scope of the invention.

According to an embodiment of the present invention, a homopolypropylene satisfying the following conditions is provided:

i) a molecular weight distribution of less than 2.4;

ii) a melt index (measured at 230° C. under a load of 2.16 kg in accordance with ASTM D1238) of 5 to 3000 g/10 min;

iii) a remaining stress ratio of 0.5% or less; and iv) a complex viscosity of 5 to 600 Pa·s at an angular frequency of 1 rad/s and a complex viscosity of 5 to 300 Pa·s at an angular frequency of 100 rad/s.

As a result of continuous experiments of the present inventors, it was found that a homopolypropylene prepared by polymerization of propylene in the presence of a specific supported catalyst, including appropriately distributed long chain branches (LCB) in a content of a certain level or higher, can be produced.

It was confirmed that the homopolypropylene had improved mechanical properties due to a relatively narrow molecular weight distribution resulting from the proper formation and distribution of LCB, and had excellent processability due to a low complex viscosity at a high angular frequency in processing. As a result, the homopolypropylene according to an embodiment of the present invention is useful in applications such as various molded articles due to excellent processability and improved mechanical properties thereof.

In addition, the homopolypropylene has more controlled physical properties, melt index, and remaining stress ratio by controlling polymerization conditions, thereby allowing production of a fiber having a thin and uniform thickness and production of a non-woven fabric having high rigidity, and a low basis weight, and especially having an increased surface roughness property to improve a washing effect when applied to a non-woven fabric for washing. In addition, since the homopolypropylene to be produced does not need to be blended with an additive, the homopolypropylene may be produced into a non-woven fabric with only primary processing, thereby improving a processing property and price competitiveness.

Hereinafter, the physical properties of the homopolypropylene according to an embodiment of the present invention and a method for preparing the homopolypropylene will be described in detail.

The homopolypropylene according to an embodiment of the present invention may show a narrow molecular weight distribution (MWD=Mw/Mn) of less than 2.4. The narrow molecular weight distribution as such is due to an increase of LCB content in the polymer, and as the homopolypropylene has the narrow molecular weight distribution of less than 2.4, a molded article having excellent mechanical properties such as high strength and a non-woven fabric having excellent rigidity can be produced. When the molecular weight distribution is 2.4 or more, strength of the homopolypropylene may be lowered, which makes fine fiberization difficult. More specifically, the homopolypropylene may have MWD of 1.5 to 2.35, and more specifically 2.0 to 2.3.

The molecular weight distribution (MWD) of the homopolypropylene may be determined by measuring a weight average molecular weight (Mw) and a number average molecular weight (Mn) using gel permeation chromatography (GPC), and then calculating a ratio of the weight average molecular weight to the number average molecular weight (Mw/Mn).

Specifically, MWD may be measured using a column having a length of 300 mm of Polymer Laboratories PLgel MIX-B and a Waters PL-GPC220 instrument, in which an evaluation temperature is 160° C., 1,2,4-trichlorobenzene is used as a solvent, and a flow rate is 1 mL/min. In addition, the sample is prepared at a concentration of 10 mg/10 mL and then supplied in an amount of 200 µL. A calibration curve formed using a polystyrene standard is used to derive Mw and Mn values. Herein, as molecular weights (g/mol) of the polystyrene standard product, nine types of 2000/10,000/30,000/70,000/200,000/700,000/2,000,000/4,000,000/10,000,000 were used.

In addition, the homopolypropylene according to an embodiment of the present invention may have a melt index (MI) of 5 to 3000 g/10 min, 7 to 1500 g/10 min, or 9 to 1000 g/10 min, as measured at 230° C. under a load of 2.16 kg in accordance with ASTM D 1238.

The melt index of the homopolypropylene can be varied considering the types of the product to be manufactured and the physical properties to be achieved, and the melting index may be adjusted depending on a hydrogen amount to be input during a polymerization process. The homopolypropylene according to an embodiment of the present invention has MI in the range as described above, thereby showing excellent processability.

More specifically, when MI is 5 g/10 min or more and less than 200 g/10 min, more specifically 5 to 100 g/10 min or 5 to 70 g/10 min, better processability may be shown in injection molding.

In addition, when MI is 200 g/10 min or more and 3000 g/10 min or less, 1500 g/10 min or less, or 1000 g/10 min or less, excellent fiber processability may be shown. Usually, in processing a non-woven fabric using a homopolypropylene, when MI of the homopolypropylene is less than 200 g/10 min, processing pressure may be increased to deteriorate fiber processability, and when MI of the homopolypropylene is more than 3000 g/10 min, it may be difficult to implement high strength of the non-woven fabric to be produced. When MI of the homopolypropylene is in the range as described above, a good balance between spinnability and non-woven fabric strength may be improved. In addition, in order to produce the homopolypropylene having an MI value in the range as described above by using the conventional Ziegler-Natta catalyst, a peroxide-based additive is required. But in the present invention, by using the catalyst including a metallocene compound as described later, there are advantages in that MI as described above is easily implemented without using the additive, and process stability is increased.

In addition, the homopolypropylene according to an embodiment of the present invention may show a remaining stress ratio of 0.5% or less.

The remaining stress ratio may be measured by a rheological-physical property test. When the rheological-physical property test is carried out under an environment similar to a non-woven fabric production process, fiber processability may be confirmed. Specifically, the remaining stress ratio may be calculated according to the following Calculation Formula 1 from a remaining stress value measured by performing a stress relaxation test in which a high strain is applied to the homopolypropylene:

Remaining stress ratio=$(RS_1/RS_0)*100$   [Calculation Formula 1]

wherein $RS_0$ is a remaining stress at any one point within 0.05 seconds (to) after a strain of 200% is applied to the homopolypropylene at 235° C., and $RS_1$ is a remaining stress at any one point ($t_1$) between 0.05 seconds and 1.50 seconds after a strain of 200% is applied to the homopolypropylene at 235° C.

In addition, in Calculation Formula 1, $RS_0$ represents a remaining stress immediately after a strain of 200% is applied to the homopolypropylene at 235° C. [for example, at any point (to) within 0.05 seconds]. Further, in Calculation Formula 1, $RS_1$ represents a remaining stress within about 1.5 seconds after to under the same conditions as $RS_0$ [for example, at any one point ($t_1$) between 0.05 seconds and 2.00 seconds].

Specifically, in Calculation Formula 1, to may be selected from 0.01 seconds, 0.015 seconds, 0.02 seconds, 0.025 seconds, 0.03 seconds, 0.035 seconds, 0.04 seconds, or 0.045 seconds. Further, in Calculation Formula 1, $t_1$ may be selected from 0.05 seconds, 0.10 seconds, 0.20 seconds, 0.30 seconds, 0.40 seconds, 0.50 seconds, 0.60 seconds, 0.70 seconds, 0.80 seconds, 0.90 seconds, 1.00 second, 1.10 seconds, 1.20 seconds, 1.30 seconds, 1.40 seconds, or 1.50 seconds. More specifically, in order to easily secure effective data when measuring the remaining stress, it is advantageous that in Calculation Formula 1, to is 0.02 seconds and $t_1$ is 1.00 seconds.

Further, the remaining stress ratio of the homopolypropylene may be measured under a condition similar to a condition of a melt process, specifically a condition of a melt blowing process to produce a non-woven fabric (e.g., 235° C.). The temperature of 235° C. is a temperature that is appropriate for performing melt process or melt blowing process by completely dissolving a homopolypropylene composition.

When the remaining stress ratio calculated according to Calculation Formula 1 is more than 0.5%, dimensional stability may be decreased to cause defects and deformation on the surface of a product. Conventionally, a non-woven fabric is produced by spinning a resin in a molten state into a fiber and drawing the semi-molten fiber after cooling. But when the remaining stress ratio calculated according to Calculation Formula 1 is high at more than 0.5%, high resistance to deformation is shown and spinnability in a spinning process is not good, thereby making it difficult to produce a fiber having a thin and uniform thickness. In addition, since an occurrence rate of single yarn is high, processability is deteriorated, for example, a time in which fiber is not produced due to the occurrence of single yarns gets longer, and it is difficult to perform a continuous spinning process. In addition, since web formation is poor, the occurrence of defects and deformation on a product surface is increased and the strength is decreased.

When the remaining stress ratio is controlled with MI of the homopolypropylene, the homopolypropylene may exhibit improved properties which are required depending on the use thereof.

As described above, the homopolypropylene according to an embodiment of the present invention may have a melt index (MI) of 5 to 3000 g/10 min as measured at 230° C. under a load of 2.16 kg in accordance with ASTM D 1238, and when the MI is 5 g/10 min or more and less than 200 g/10 min, more specifically 5 to 100 g/10 min or 5 to 70 g/10 min, and the remaining stress ratio is 0.2 to 0.5%, the homopolypropylene may exhibit improved processability in injection molding.

In addition, when the MI is 200 to 3000 g/10 min, more specifically 200 to 1500 g/10 min or 200 to 1000 g/10 min, and the remaining stress ratio is 0.1% or less or 0.001 to 0.1%, more specifically 0.01 to 0.1%, the homopolypropylene may exhibit improved fiber processability in a spinning process.

In addition, the homopolypropylene according to an embodiment of the present invention may have a complex viscosity of 5 to 600 Pa·s, 8 to 550 Pa·s, or 10 to 520 Pa·s at an angular frequency of 1 rad/s, and a complex viscosity of 5 to 300 Pa·s or 7 to 260 Pa·s at an angular frequency of 100 rad/s.

The complex viscosity depending on the angular frequency is related to flowability and/or processability. The complex viscosity of the homopolypropylene can also be controlled with MI in order to improve properties which are required depending on the use thereof.

Specifically, when the melt index (measured at 230° C. under a load of 2.16 kg in accordance with ASTM D1238) is 5 to 70 g/10 min, the complex viscosity at an angular frequency of 1 rad/s is 430 to 600 Pa·s, 450 to 550 Pa·s, or 490 to 540 Pa·s, and a complex viscosity at an angular frequency of 100 rad/s is 180 to 300 Pa·s or 190 to 260 Pa·s, the homopolypropylene may exhibit improved mechanical properties such as excellent strength due to a high complex viscosity at a low angular frequency, and may exhibit improved processability with excellent flowability due to a low complex viscosity at a high angular frequency corresponding to a processing region. That is, the complex viscosity of the homopolypropylene according to an embodiment of the present invention is largely changed at each of an angular frequency as compared with a conventional homopolypropylene having similar density and weight average molecular weight, in a graph of complex viscosity depending on an angular frequency. Accordingly, the homopolypropylene has an excellent shear thinning effect with excellent mechanical properties and processability. As a result, the homopolypropylene may exhibit improved processability in injection molding.

In addition, when the melt index (measured at 230° C. under a load of 2.16 kg in accordance with ASTM D1238) is more than 70 g/10 min and 3000 g/10 min or less, more specifically 200 to 1500 g/10 min, and still more specifically 200 to 1000 g/10 min, the complex viscosity at an angular frequency of 1 rad/s is 5 to 200 Pa·s, 8 to 100 Pa·s, or 10 to 60 Pa·s, and the complex viscosity at an angular frequency of 100 rad/s is 5 to 150 Pa·s, 7 to 120 Pa·s, or 10 to 50 Pa·s, the homopolypropylene may exhibit excellent fiber processability in a spinning process.

The complex viscosity depending on the angular frequency may be determined with a dynamic frequency sweep at 190° C. using an advanced rheometric expansion system (ARES). The dynamic frequency sweep may be measured by using a 25 mm parallel plate in a disk shape.

In addition, the homopolypropylene according to an embodiment of the present invention has xylene soluble (Xs) of 1.0 wt % or less or 0.1 to 1.0 wt %, and may show high tacticity.

The xylene soluble is included in a content (wt %) of a xylene soluble polymer in cooled xylene which is determined by dissolving a homopolypropylene in xylene and crystallizing an insoluble part of the polymer therefrom by cooling the solution. The xylene solubles contain a polymer chain of low tacticity. Accordingly, the lower the xylene soluble, the higher the tacticity. Due to the high tacticity as such, the homopolypropylene may show excellent rigidity when manufacturing various products. Considering the improvement of the effect through control of the xylene solubles, the xylene solubles of the homopolypropylene may be more specifically 0.5 to 1.0 wt %, and still more specifically 0.6 to 0.8 wt %.

In the present invention, the xylene solubles are measured by a method including: putting xylene in a homopolypropylene sample, performing pre-treatment by heating at 135° C. for 1 hour and cooling for 30 minutes, flowing xylene into OmniSec equipment (Viscotek, FIPA) at a flow rate of 1 mL/min for 4 hours, measuring a concentration of the pre-treated sample and the injected amount thereof after baselines of a refractive index (RI), a pressure across middle of bridge (DP), and an inlet pressure through bridge top to bottom (IP) are stabilized, and then calculating a peak area.

In addition, the homopolypropylene according to an embodiment of the present invention may show a weight average molecular weight (Mw) of 30,000 to 300,000 g/mol, more specifically 50,000 to 250,000 g/mol, still more specifically 50,000 to 100,000 g/mol, or more than 100,000 g/mol and 250,000 g/mol or less. Due to the molecular weight as such, the homopolypropylene may exhibit an improved effect in mechanical properties such as strength and other appropriate physical properties in a manufacture process for various molded products.

The weight average molecular weight of the homopolypropylene may be measured using gel permeation chromatography (GPC) as described above, and polystyrene or the like may be used as a standard material in GPC measurement.

In addition, the homopolypropylene may have a melting point (Tm) of 155 to 160° C. When the homopolypropylene has Tm in the above range, the homopolypropylene may show excellent spinnability and productivity. Tm may be more specifically 155° C. or more and 157° C. or less.

Meanwhile, the melting point in the present invention may be measured using differential scanning calorimetry (DSC). Specifically, the measurement is performed by a method including: raising the temperature of the homopolypropylene to 200° C., maintaining the temperature for 5 minutes, lowering the temperature to 30° C., raising the temperature again, and determining the temperature of the highest peak of DSC curve which is obtained by using a differential scanning calorimeter (DSC, manufactured by TA) as the melting point. Herein, the scanning speeds in the temperature raising processes and temperature lowering processes are 10° C./min, respectively, and the melting point is determined from the result in a second temperature rising section.

More specifically, the homopolypropylene according to an embodiment of the present invention may have a melt index (measured at 230° C. under a load of 2.16 kg in accordance with ASTM D1238) of 5 g/10 min or more and less than 200 g/10 min or 5 to 70 g/10 min, a complex viscosity of 430 to 600 Pa·s at an angular frequency of 1 rad/s, a complex viscosity of 180 to 300 Pa·s at an angular frequency of 100 rad/s, and a remaining stress ratio of 0.2 to 0.5% under the condition satisfying the physical properties as described above, and when the physical property requirements are all satisfied, the homopolypropylene may exhibit excellent moldability in injection molding.

In addition, the homopolypropylene according to another embodiment may have a melt index (measured at 230° C. under a load of 2.16 kg in accordance with ASTM D1238) of 200 to 1000 g/10 min, a molecular weight distribution of 1.5 to 2.35, a melting point of 155 to 157° C., xylene solubles of 0.5 to 1.0 wt %, and a remaining stress ratio of 0.001 to 0.1% under the conditions satisfying the physical properties as described above, and when all of the physical property requirements are satisfied, the homopolypropylene may exhibit excellent fiber processability.

A homopolypropylene prepared using a conventional Ziegler-Natta catalyst has a low melt index (MI) due to low hydrogen reactivity of the Ziegler-Natta catalyst. Accordingly, in order to form a highly flowable product, the homopolypropylene is subjected to vis-breaking or a controlled rheology process after mixing with a peroxide-based decomposition accelerator. However, due to the Ziegler-Natta catalyst having multiple sites, the homopolypropylene has a broad molecular weight distribution of 3.0 or more, and thus there is a limitation in an increase of fiber fineness when applied to a fiber.

In this regard, in the present invention, the homopolypropylene having the physical properties as described above is prepared by using a catalyst including the compound of Chemical Formula 1 described later, and by controlling a hydrogen input amount during polymerization. As a result, the homopolypropylene exhibits excellent fiber processability to allow production of a fiber having a thin and uniform thickness and production of a non-woven fabric having high rigidity and a low basis weight. And when applying the homopolypropylene to a non-woven fabric for washing, the produced non-woven fabric has increased surface roughness together with increased strength so as to improve a washing effect. In addition, since the homopolypropylene does not need to be blended with an additive, the non-woven fabric is prepared with only primary processing and has an improved processing property and price competitiveness.

The homopolypropylene according to an embodiment of the present invention having the physical characteristics as described above may be produced by a production method including polymerizing a propylene monomer in the presence of a supported catalyst including a silica carrier, and a compound of the Chemical Formula 1 and a cocatalyst which are supported on the silica carrier:

[Chemical Formula 1]

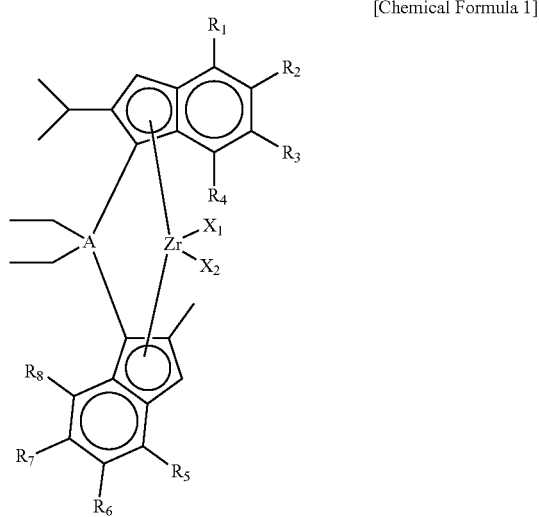

wherein $X_1$ and $X_2$ are each independently a halogen, $R_1$ and $R_5$ are each independently a $C_{6-20}$ aryl substituted with a $C_{1-20}$ alkyl, $R_2$ to $R_4$ and $R_6$ to $R_8$ are each independently hydrogen, a halogen, a $C_{1-20}$ alkyl, a $C_{2-20}$ alkenyl, a $C_{1-20}$ alkylsilyl, a $C_{1-20}$ silylalkyl, a $C_{1-20}$ alkoxysilyl, a $C_{1-20}$ ether, a $C_{1-20}$ silylether, a $C_{1-20}$ alkoxy, a $C_{6-20}$ aryl, a $C_{7-20}$ alkylaryl, or a $C_{7-20}$ arylalkyl, and A is carbon, silicon, or germanium.

As a result of continuous experiments of the present inventors, it was confirmed that the homopolypropylene according to an embodiment of the present invention may be produced in accordance with the following technical mechanism by using the supported catalyst including the compound of Chemical Formula 1 and the cocatalyst.

First, as the compound of Chemical Formula 1 is used as a single catalyst active species, the homopolypropylene may have a narrow molecular weight distribution as compared with the homopolypropylene produced using two or more catalysts.

Furthermore, the compound of Chemical Formula 1 has a divalent functional group A which is 2-substituted with an ethyl group, as a bridge group connecting two ligands including an indenyl group, thereby having a larger atom size than an existing carbon bridge to increase an available angle, and a monomer is easily approached so that a catalyst activity may be increased.

In addition, in two indenyl ligands, the 2-position is substituted with a methyl group/an isopropyl group respectively, and the 4-position ($R_1$ and $R_5$) includes an alkyl-substituted aryl group, respectively, and thus the compound has an inductive effect capable of supplying sufficient electrons so that the catalyst activity is increased. In addition, a long chain branch (LCB) is formed in an appropriate ratio/distribution in a homopolypropylene, thereby a homopolypropylene satisfying all of the physical properties may be produced.

In addition, the compound of Chemical Formula 1 includes zirconium (Zr) having more orbitals capable of accepting electrons than a compound including other Group 14 elements such as Hf, as a center metal, thereby being easily bonded to a monomer with higher affinity. As a result, the catalyst activity is further enhanced.

In the present specification, the following terms may be defined as follows, unless otherwise particularly limited.

The halogen may be fluorine (F), chlorine (Cl), bromine (Br), or iodine (I).

A $C_{1-20}$ alkyl group may be a linear, branched, or cyclic alkyl group. Specifically, the $C_{1-20}$ alkyl group may be a linear $C_{1-15}$ alkyl group, a linear $C_{1-10}$ alkyl group, a linear $C_{1-5}$ alkyl group, a branched or cyclic $C_{3-20}$ alkyl group, a branched or cyclic $C_{3-15}$ alkyl group, or a branched or cyclic $C_{3-10}$ alkyl group. More specifically, the $C_{1-20}$ alkyl group may be a methyl group, an ethyl group, an n-propyl group, an iso-propyl group, an n-butyl group, an iso-butyl group, a tert-butyl group, an n-pentyl group, an iso-pentyl group, a neo-pentyl group, a cyclohexyl group, or the like.

A $C_{2-20}$ alkenyl group may be a linear, branched, or cyclic alkenyl group. Specifically, the $C_{2-20}$ alkenyl group may be a linear $C_{2-20}$ alkenyl group, a linear $C_{2-10}$ alkenyl group, a linear $C_{2-5}$ alkenyl group, a branched $C_{3-20}$ alkenyl group, a branched $C_{3-15}$ alkenyl group, a branched $C_{3-10}$ alkenyl group, a cyclic $C_{5-20}$ alkenyl group, or a cyclic $C_{5-10}$ alkenyl group. More specifically, the $C_{2-20}$ alkenyl group may be an ethenyl group, a propenyl group, a butenyl group, a pentenyl group, cyclohexenyl group, or the like.

A $C_{6-20}$ aryl may refer to a monocyclic, bicyclic, or tricyclic aromatic hydrocarbon. Specifically, the $C_{6-20}$ aryl may be a phenyl group, a naphthyl group, an anthracenyl group, or the like.

A $C_{7-20}$ alkylaryl may refer to a substituent in which one or more hydrogens of aryl are substituted by alkyl. Specifically, the $C_{7-20}$ alkylaryl may be methylphenyl, ethylphenyl, n-propylphenyl, iso-propylphenyl, n-butylphenyl, iso-butylphenyl, tert-butylphenyl, cyclohexylphenyl, or the like.

A $C_{7-20}$ arylalkyl may refer to a substituent in which one or more hydrogens are substituted by aryl. Specifically, the $C_{7-20}$ arylalkyl may be a benzyl group, a phenylpropyl, a phenylhexyl, or the like.

More specifically, in Chemical Formula 1, $R_1$ and $R_5$ may each independently be a $C_{6-12}$ aryl group substituted with a $C_{1-10}$ alkyl, and more specifically, may be a phenyl group substituted with a branched $C_{3-6}$ alkyl group such as a tert-butyl phenyl. In addition, a substituted position of the alkyl group to the phenyl group may be the 4-position located at a para position to a $R_1$ or $R_5$ bonded to an indenyl group.

In addition, in Chemical Formula 1, $R_2$ to $R_4$ and $R_6$ to $R_8$ may each independently be hydrogen, and $X_1$ and $X_2$ may each independently be chloro.

In addition, in Chemical Formula 1, A may be silicon (Si). Further, substituents of A may be identical to each other from the viewpoint of increasing solubility to improve support efficiency, and may be ethyl, respectively. When an alkyl group having 2 carbon atoms is included as a substituent for A in a bridge group, a problem in that when a substituent for an element of a conventional bridge group is a methyl group having one carbon atom, solubility is poor so that reactivity is deteriorated, may be solved.

A representative example of the compound represented by Chemical Formula 1 is as follows:

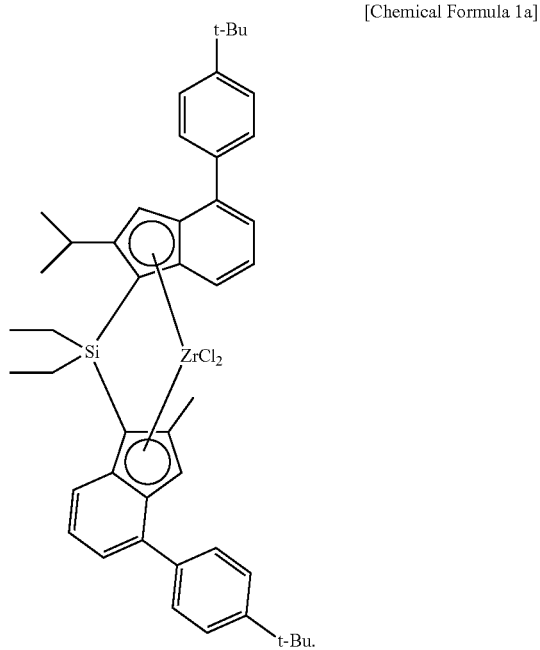

[Chemical Formula 1a]

The compound of Chemical Formula 1 may be synthesized by applying known reactions, and for a more detailed synthesis method, preparation examples described later may be referred to.

Meanwhile, the compound of Chemical Formula 1 may be used in a state of being a catalyst supported on the silica carrier. By using the catalyst supported on the silica carrier, the homopolypropylene to be produced has excellent morphology and physical properties and may be appropriately used in a conventional slurry polymerization, bulk polymerization, or gas phase polymerization process.

As the silica carrier, a carrier containing a hydroxy group or a siloxane group on the surface may be used, and more specifically, a carrier having a hydroxy group and a siloxane group showing high reactivity, which is dried at a high temperature to remove moisture on the surface, may be used. For example, silica, silica-alumina, silica-magnesia, or the like which is dried at a high temperature may be used, and these may contain oxide, carbonate, sulfate, and nitrate components such as $Na_2O$, $K_2CO_3$, $BaSO_4$, and $Mg(NO_3)_2$.

A drying temperature of the carrier may be 200 to 800° C., more specifically 300 to 600° C., and still more specifically 300 to 400° C. When the drying temperature is less than 200° C., there is too much moisture so that moisture on the surface may be reacted with a cocatalyst, and when the drying temperature is more than 800° C., pores on the carrier surface are combined to decrease a surface area, and hydroxy groups are lost and only siloxane groups remain so that reaction sites with the cocatalyst may be decreased.

An amount of the hydroxyl group on the carrier surface may be 0.1 to 10 mmol/g, and more specifically 0.5 to 5 mmol/g. An amount of the hydroxy group on the carrier surface may be adjusted by a method and conditions for producing a carrier, or drying conditions, for example, temperature, time, vacuum or spray drying, or the like. When an amount of the hydroxy group is less than 0.1 mmol/g, reaction sites with the cocatalyst may be decreased, and when an amount of the hydroxy group is more than 10 mmol/g, the amount of the hydroxy group may be caused by moisture rather than the hydroxy group present on the carrier particle surface, and in this case, degradation of polymerization efficiency is a concern.

In addition, when the compound of Chemical Formula 1 is supported on the carrier, a weight ratio of the compound of Chemical Formula 1 to the carrier may be 1:1 to 1:1000. When the carrier and the compound of Chemical Formula 1 are included at the weight ratio, appropriate supported catalyst activity is shown, which may be advantageous from the viewpoint of catalyst activity maintenance and economic feasibility. More specifically, the weight ratio of the compound of Chemical Formula 1 to the carrier may be 1:10 to 1:30, and more specifically 1:15 to 1:20.

In addition, the catalyst composition may further include a cocatalyst from the viewpoint of improving high activity and process stability, in addition to the compound represented by Chemical Formula 1 and the carrier. The cocatalyst may include one or more of an aluminoxane-based compound represented by the following Chemical Formula 2:

  [Chemical formula 2]

in Chemical Formula 2 each $R_{11}$ may be identical to or different from each other, and each is independently a halogen, a $C_{1-20}$ hydrocarbon, or a $C_{1-20}$ hydrocarbon substituted with a halogen, and m is an integer of 2 or more.

An example of the compound represented by Chemical Formula 2 may include methylaluminoxane, ethylaluminoxane, isobutylaluminoxane, butylaluminoxane, or the like, and a mixture of any one or more thereof may be used. Among them, methylaluminoxane acts as a scavenger of a hydroxyl group present in a carrier surface, thereby further improving activity. In addition, methylaluminoxane converts a halogen group of a catalyst precursor into a methyl group, thereby promoting chain growth of the homopolypropylene.

When the cocatalyst is further included, a weight ratio of the compound of Chemical Formula 1 to the cocatalyst may be 1:1 to 1:20. When the cocatalyst and the compound of Chemical Formula 1 are included at the weight ratio, it may be advantageous in terms of maintenance of the catalyst activity and economic feasibility. More specifically, the weight ratio of the compound of Chemical Formula 1 to the cocatalyst may be 1:5 to 1:20, and more specifically 1:5 to 1:15.

When the catalyst includes both the carrier and the cocatalyst, the catalyst may be prepared by a method including supporting the cocatalyst on the carrier and supporting the compound of Chemical Formula 1 on the carrier, in which the order of supporting the cocatalyst and the compound of Chemical Formula 1 may be changed as needed.

In addition, the supported catalyst may further include an antistatic agent. As the antistatic agent, for example, an amine alcohol-based compound of the following Chemical Formula 3 (product name: Atmer 163™, manufactured by CRODA) may be used, and optional components which are well-known in the art as the antistatic agent may also be used without limitation. By using the antistatic agent, generation of static electricity in polymerization/production of the homopolypropylene is suppressed, thereby a homopolypropylene having better physical properties including the physical properties described above may be produced.

[Chemical Formula 3]

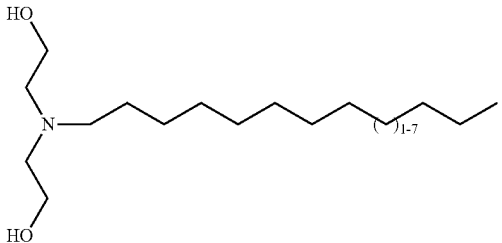

When the antistatic agent is further included, the antistatic agent may be included at 1 to 10 parts by weight, and more specifically 1 to 5 parts by weight, based on 100 parts by weight of the carrier. When the antistatic agent is included in the range described above, a homopolypropylene having better physical properties including all of the physical properties described above may be produced.

When the catalyst includes all of the carrier, the cocatalyst, and the antistatic agent described above, the catalyst may be produced by a method including: supporting a cocatalyst compound on a carrier; supporting the compound represented by Chemical Formula 1 on the carrier; adding an antistatic agent in a slurry state to the carrier on which the cocatalyst and the compound of Chemical Formula 1 are supported; and performing heat treatment. The supported catalyst having a structure that is determined by the support/treatment order may exhibit excellent process stability with high catalyst activity in the production process of polypropylene.

The catalyst may be used in a slurry state or in a diluted state in a solvent, or may be used in the form of a mud catalyst mixed with an oil and grease mixture, depending on a polymerization method.

When the catalyst is used in a slurry state or in a diluted state in a solvent, an example of the solvent may include an aliphatic hydrocarbon solvent having 5 to 12 carbon atoms which is suitable for a polymerization process of a propylene monomer, for example, pentane, hexane, heptane, nonane, decane, or isomers thereof, an aromatic hydrocarbon solvent such as toluene or benzene, a hydrocarbon solvent substituted with a chlorine atom such as dichloromethane or chlorobenzene, or the like, and any one or a mixture of two or more thereof may be used. In this case, the catalyst composition may further include the above-described solvent, and before use, the solvent may be treated with a small amount of alkylaluminum, thereby removing a small amount of water or air which may act as a catalytic poison.

In addition, when a polymerization method such as continuous bulk polymerization is used, the catalyst may be used in the form of a mud catalyst mixed with an oil and grease. In this case, as compared with the case of being dissolved in or diluted with a solvent, an amount of a volatile organic compound contained in the homopolypropylene may be further decreased, and as a result, an odor caused by the volatile organic compound may also be decreased.

The homopolypropylene may be produced by a polymerization process in which the catalyst composition including the supported catalyst described above and propylene are brought into contact with each other in the presence or absence of hydrogen gas.

Here, the hydrogen gas may be input so that the amount is 50 to 2500 ppm, based on the total weight of the propylene monomer. By adjusting the use amount of hydrogen gas, sufficient catalyst activity is shown, and a molecular weight distribution and flowability of the homopolypropylene composition to be produced may be adjusted to be within a desired range, and thus, the homopolypropylene polymer having appropriate physical properties depending on the use may be produced. More specifically, the hydrogen gas may be included at a content of 50 ppm or more, 70 ppm or more, or 300 ppm or more, and 2500 ppm or less, 2000 ppm or less, 1500 ppm or less, or 1000 ppm or less.

For example, when hydrogen is input at a content of 300 ppm or more or 400 ppm or more and 1450 ppm or less or 1000 ppm or less, the homopolypropylene to be produced has an appropriate MI, specifically MI of 200 to 3000 g/10 min, to exhibit excellent processability, and particularly when the homopolypropylene is used for the production of a non-woven fabric, the homopolypropylene may improve processability of fiber and fine fiberization so as to enhance strength and roughness of the non-woven fabric.

The homopolypropylene may be produced by a continuous polymerization process, and various polymerization processes which are known as a polymerization reaction of an olefin monomer such as a continuous solution polymerization process, a bulk polymerization process, a suspension polymerization process, a slurry polymerization process, or an emulsion polymerization process, may be adopted. Particularly, from the viewpoint of obtaining a uniform molecular weight distribution and commercial manufacturability, a continuous bulk-slurry polymerization process is preferred.

Specifically, the polymerization reaction may be performed at a temperature of 40° C. or more or 60° C. or more and 110° C. or less or 100° C. or less under a pressure of 1 kgf/cm$^2$ or more or 30 kgf/cm$^2$ or more and 100 kgf/cm$^2$ or less or 50 kgf/cm$^2$ or less.

In addition, a trialkylaluminum such as triethylaluminum may be selectively added in the polymerization reaction.

When moisture or impurities are present in a polymerization reactor, the catalyst is partially decomposed, but since the trialkylaluminum serves as a scavenger which previously captures moisture or impurities present in the reactor, activity of the catalyst used in the production may be maximized, and as a result, a homopolypropylene having excellent physical properties, particularly having a narrow molecular weight distribution, may be more efficiently produced. Specifically, in the trialkylaluminum, alkyl is as defined above, and may be specifically a $C_{1-20}$ alkyl, and more specifically a linear $C_{1-6}$ alkyl such as methyl or ethyl.

In addition, the trialkylaluminum (based on 1 M) may be added in an amount of 0.01 ml or more, or 0.1 ml or 0.3 ml or more and 20 ml or less or 10 ml or less, based on 100 g of the propylene monomer, and when the polymerization reaction is performed in the presence of trialkylaluminum in the range of the content, a homopolypropylene having desired physical properties may be more easily produced.

Since the homopolypropylene according to an embodiment of the present invention satisfies an appropriate remaining stress ratio, a narrow molecular weight distribution, and a predetermined complex viscosity, the homopolypropylene may exhibit improved melt processability together with mechanical properties such as high strength when the homopolypropylene is molded into various products such as various molded articles. In addition, the homopolypropylene has low xylene solubles and MI in an optimal range by controlling a hydrogen input amount during polymerization, thereby being capable of producing a fiber having a thin and uniform thickness, imparting rougher texture than existing products and simultaneously implementing excellent toughness so that the fiber is not easily torn even with high strength. As a result, the homopolypropylene may be particularly useful for production of a non-woven fabric requiring high surface roughness together with high rigidity and a low basis weight, specifically a non-woven fabric for washing such as a scrubber.

Therefore, according to another embodiment of the present invention, a molded article including the homopolypropylene is provided.

The molded article may specifically be an injection molded article, and may be produced by a common method except for using the homopolypropylene of the embodiment described above.

According to another embodiment of the present invention, a resin composition including the homopolypropylene and a non-woven fabric produced using the resin composition are provided.

The resin composition includes the homopolypropylene, thereby showing excellent fiber processability, and as a result, allowing fine fiberization.

In the present invention, fiber processability means that long-term and continuous production is possible without occurrence of a single yarn of fiber in spinning processing, or a fiber which is more fine-fiberized and has higher strength is produced by allowing drawing at a high magnification due to a uniform molecular weight distribution in a drawing process.

In addition, the resin composition may selectively further include one or more additives such as an antioxidant, a neutralizing agent, a slip agent, an anti-blocking agent, an ultraviolet (UV) stabilizer, or an antistatic agent.

As the neutralizing agent, calcium stearate or the like may be used.

In addition, an example of the antioxidant may include a phenol-based antioxidant such as tetrakis(methylene(3,5-di-t-butyl-hydroxyhydrocinnamate))methane or 1,3,5-trimethyl-2,4,6-tris(3,5-di-t-butyl-4-hydroxybenzyl)benzene, a phosphorus-based antioxidant, or the like, and any one or a mixture of two or more thereof may be used. As a commercially available antioxidant, Irganox 1010™ (manufactured by BASF), Irganox 168™ (manufactured by BASF), or the like may be used. Since the phenol-based antioxidant has an excellent characteristic of preventing decomposition by heat as compared with a common antioxidant such as a phosphorus antioxidant, and the phosphorus antioxidant has better compatibility with a polymer in the resin composition, more specifically the phenol-based antioxidant and the phosphorus-based antioxidant may be used in combination at a weight ratio of 2:1 to 1:2, or 1:1 or 1:2.

As the slip agent, Erucamide™ (manufactured by ALDRICH) as a commercially available material may be used.

In addition, as the anti-blocking agent, $SiO_2$ or the like may be used.

A content of the additive may be determined within a range in which the physical properties of the resin composition are not impaired, and specifically, the additive may be input at a content of 500 ppm or more or 700 ppm or more and 2500 ppm or less or 2000 ppm or less, based on the total weight of the homopolypropylene.

Considering the constituent components in the resin composition and an effect of improving fiber processability due to controlling the content, more specifically, the resin composition according to an embodiment of the present invention may further include an antioxidant at a content of 500 to 2000 ppm, based on the total weight of the homopolypropylene, and the antioxidant may include a phenol-based antioxidant and a phosphorus antioxidant at a weight ratio of 2:1 to 1:2.

In addition, the non-woven fabric is produced using the resin composition described above, and may be a spunbond non-woven fabric, a melt blown non-woven fabric, or a double-layer non-woven spunbond/spunbond fabric.

The resin composition for a non-woven fabric and the non-woven fabric may be produced by a common method except for using the homopolypropylene described above.

For example, the spunbond non-woven fabric may be produced by a melt spun process in which the resin composition including the homopolypropylene is melted, spun, and bonded by heat to form a web, and the melt blown non-woven fabric may be produced by a melt blown process in which the resin composition is melted and then subjected to extrusion spinning by nozzles, drawn and opened to an extra fine fiber by high-pressure hot air, and integrated to form a molten fiber web. In addition the double-layer non-woven spunbond/spunbond fabric may be produced by performing processes in an order of spunbond-melt blown-melt blown-spunbond.

Since the non-woven fabric is produced using the homopolypropylene, the non-woven fabric has high rigidity even with low basis weight.

Specifically, the non-woven fabric has strength in a machine direction (MD) of 15 N/5 cm or more and 40 N/5 cm or less and a strength in a cross direction (CD) of 10 N/5 cm or more and 30 N/5 cm or less, as measured by a method in accordance with ASTM D-5035 under the condition that the basis weight of the non-woven fabric is 20 to 40 gsm.

Hereinafter, preferred exemplary embodiments are presented for better understanding of the present invention. However, the following examples only illustrate the present invention, and the content of the present invention is not limited to the following examples.

<Production of Supported Catalyst>

Comparative Preparation Example 1

Step 1: Production of Transition Metal Compound

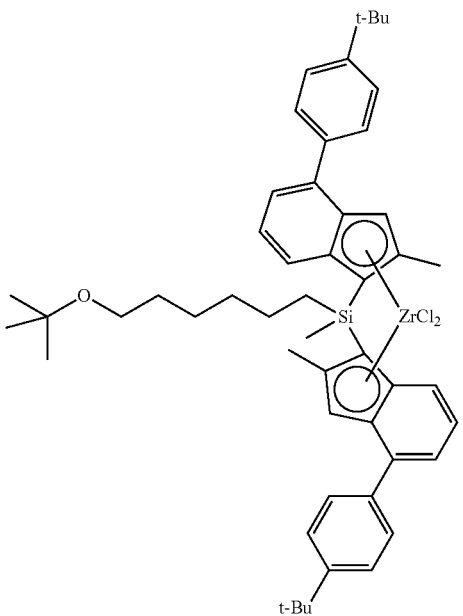

A catalyst of the above chemical formula was produced by the following method.

2-methyl-4-tert-butylphenyl indene (20.0 g, 76 mmol) was dissolved in a solution of toluene/THF=10/1 (230 mL), an n-butyllithium solution (2.5 M, hexane solvent, 22 g) was slowly added dropwise at 0° C., and stirring was performed at room temperature for a day. Thereafter, (6-t-butoxyhexyl) dichloromethylsilane (1.27 g) was slowly added dropwise to the mixed solution at −78° C., stirred for about 10 minutes, and stirred at room temperature for a day. Thereafter, water was added to separate an organic layer, and the solvent was distilled under reduced pressure to obtain (6-t-butoxyhexyl) (methyl)-bis(2-methyl-4-tert-butylphenylindenyl)silane.

The previously prepared (6-t-butoxyhexyl) (methyl)-bis (2-methyl-4-phenyl)indenylsilane was dissolved in a solution of toluene/THF=5/1 (95 mL), an n-butyllithium solution (2.5 M hexane solvent, 22 g) was slowly added dropwise at −78° C., and stirring was performed at room temperature for a day. Bis(N,N'-diphenyl-1,3-propanediamido)dichlorozirconium bis(tetra hydrofuran) [Zr (C₅H₆NCH₂CH₂CH₂NC₅H₆)Cl₂(C₄H₈O)₂] was dissolved in toluene (229 mL), added dropwise to the reaction solution at −78° C., and stirred at room temperature for a day. The reaction solution was cooled to −78° C., an HCl ether solution (1 M, 183 mL) was slowly added dropwise, and then stirring was performed at 0° C. for 1 hour. Thereafter, filtration and vacuum drying were performed, hexane (350 mL) was added thereto, and stirring was performed to precipitate a crystal. The precipitated crystal was filtered and dried under reduced pressure to obtain [(6-t-butoxyhexylmethylsiane-diyl)-bis(2-methyl-4-tert-butylphenylindenyl)] zirconium dichloride.

Step 2: Production of Supported Catalyst

To a 3 L reactor, 150 g of silica and a 10 wt % methylaluminoxane solution (1214 g, toluene solvent) were added and reacted at 95° C. for 24 hours. After precipitation, an upper portion was removed and washing was performed twice with toluene. The transition metal compound (9.6 g) prepared above was diluted with 500 ml of toluene and added to a reactor, and reacted at 50° C. for 5 hours. When precipitation was finished after completion of the reaction, a reaction product remaining after removal of an upper layer solution was washed with toluene and washed again with hexane, 4.5 g of an antistatic agent (Atmer 163™, manufactured by CRODA) was added, and filtration and vacuum drying were performed, thereby obtaining 250 g of a silica-supported metallocene catalyst in the form of solid particles.

Comparative Preparation Example 2

Step 1: Production of Transition Metal Compound

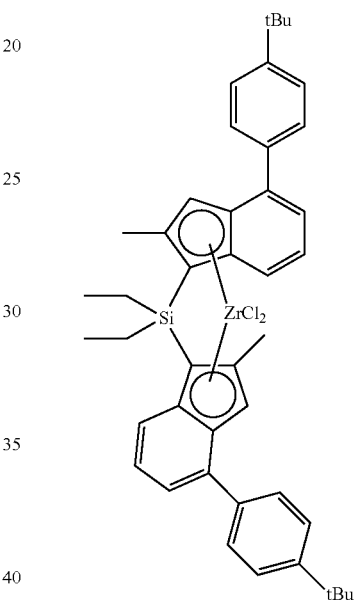

A catalyst of the above formula was produced by the following method.

To a 250 mL Schlenk flask, 7-tert-butylphenyl-2-methylindene (34.4 mmol) was added and dried under reduced pressure. Under an argon atmosphere, anhydrous toluene/ THF (172/34 mL) was added for dilution and then 2.5 M n-BuLi in hexane (36.2 mmol, 14.5 mL) was slowly added at −25° C. Stirring was performed at 25° C. for 4 hours or more, Et₂SiCl₂ (17.2 mmol) was added to the reactant, and stirring was performed at 25° C. overnight. A separatory funnel was used to extract MTBE and H₂O, and then MgSO₄ was added to an organic layer to dry remaining water. A solid was filtered out with a reduced pressure filter and the liquid was distilled under reduced pressure for concentration.

To a 100 mL Schlenk flask, (diethylsilane-diyl)-bis(2-methyl-4-(4-tert-butyl-phenyl)indenyl)silane (10.7 mmol) was added and dried under reduced pressure. Under an argon atmosphere, anhydrous toluene (16.0 mL) and THF (1.60 mL) were added for dilution and 2.5 M n-BuLi in hexane (22.5 mmol, 9.00 mL) was slowly added at −25° C. After stirring at 25° C. for 2 hours, ZrCl₄·2THF (10.7 mmol) in a toluene slurry was slowly added at −25° C. After stirring at 25° C. overnight, drying under reduced pressure was performed, anhydrous dichloromethane was added for dilution, a G4 size glass filter was used to filter out LiCl and impurities, and the liquid was distilled under reduced pressure to be concentrated. From a product having a Rac:Meso ratio of about 1.5:1 (weight ratio), a racemic rich product was obtained using dichloromethane.

Step 2: Production of Supported Catalyst

A supported catalyst was produced in the same manner as in Step 2 of Comparative Preparation Example 1, except for using the transition metal compound prepared in Step 1.

Comparative Preparation Example 3

Step 1: Production of Transition Metal Compound

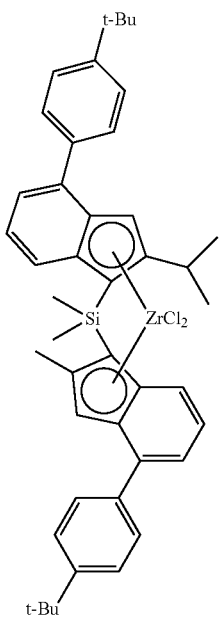

A catalyst of the above formula was produced by the following method.

To a 250 mL Schlenk flask, 7-tert-butylphenyl-2-isopropylindene (10.0 g, 34.4 mmol) was added and dried under reduced pressure. Under an argon atmosphere, anhydrous diethyl ether (172 mL) was added for dilution, and 2.5 M n-BuLi in hexane (36.2 mmol, 14.5 mL) was slowly added at −25° C.

After stirring at 25° C. for 4 hours or more, Me$_2$SiCl$_2$ (68.9 mmol, 8.30 mL) was added to the reactant, and stirring was performed at 25° C. overnight. A G4 size glass filter was used to filter out LiCl, and the filtrate was dried under reduced pressure. To another 250 mL Schlenk flask, 7-tert-butylphenyl-2-methylindene (9.04 g, 34.4 mmol) and CuCN (1.72 mmol, 0.15 g) were added and dried under reduced pressure. Under an argon atmosphere, anhydrous toluene (208 mL) and THE (20.4 mL) were added for dilution, 2.5 M n-BuLi in hexane (36.2 mmol, 14.5 mL) was slowly added at −25° C., and stirring was performed at 25° C. overnight. The above mono-Si solution was input to the flask. Thereafter, stirring was performed at 25° C. overnight, extraction was performed with water, and drying was performed. To a 100 mL Schlenk flask, tert-butylamine (7.09 mmol, 0.74 mL) was added, anhydrous toluene (7.88 mL) and THE (0.57 mL) were added under an argon atmosphere for dilution, and 2.5 M n-BuLi in hexane (7.44 mmol, 2.98 mL) was slowly added at −25° C. After stirring at 25° C. for 2 hours or more, the solution was added at 25° C. to another Schlenk flask containing ZrCl$_4$.2THF (2.67 g, 7.09 mmol) and toluene (6.2 mL), and stirred at 25° C. for 2 hours or more. To another 100 mL Schlenk flask, a UT1 ligand (4.32 g, 7.09 mmol) was added and dried under reduced pressure. Under an argon atmosphere, anhydrous toluene (11.8 mL) and THE (1.18 mL) were added for dilution, and 2.5 M n-BuLi in hexane (14.9 mmol, 5.96 mL) was slowly added at −25° C. After stirring at 25° C. for 2 hours or more, the Zr-tert-butylamide solution synthesized before was added at 25° C.

After stirring at 25° C. overnight, 1.0 M HCl in diethyl ether (15.6 mmol, 15.6 mL) was added at −25° C., and stirring was performed for about 1 hour until the temperature was 25° C. Filtration was performed with a G4 size glass filter to obtain a racemic rich catalyst with a salt. The obtained solid was dissolved in dichloromethane, the filtrate was dried under reduced pressure, and it was washed with hexane once again to obtain a final catalyst precursor.

Step 2: Production of Supported Catalyst

A supported catalyst was produced in the same manner as in Step 2 of Comparative Preparation Example 1, except for using the transition metal compound prepared in Step 1.

Comparative Preparation Example 4

Step 1: Production of Transition Metal Compound

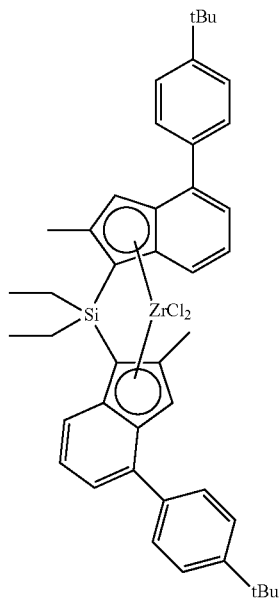

2-methyl-4-tert-butyl-phenylindene (20.0 g) was dissolved in a toluene/THF solution (220 mL) having a volume ratio of 10/1, an n-butyllithium solution (2.5 M, hexane solvent, 22.2 g) was slowly added dropwise at 0° C., and stirring was performed at room temperature for a day. To the resulted mixed solution, diethyldichlorosilane (6.2 g) was slowly added dropwise at −78° C., stirred for about 10 minutes, and then further stirred at room temperature for a day. Thereafter, water was added to separate an organic layer, and the solvent was distilled under reduced pressure to obtain (diethylsilane-diyl)-bis(2-methyl-4-(4-tert-butyl-phenyl)indenyl)silane.

(Diethylsilane-diyl)-bis(2-methyl-4-(4-tert-butyl-phenyl)indenyl)silane produced above was dissolved in a toluene/THF solution (120 mL) having a volume ratio=5/1, an n-butyllithium solution (2.5 M, hexane solvent, 22.2 g) was slowly added dropwise at −78° C., and stirring was performed at room temperature for a day. To the resulted reaction solution, a solution of zirconium chloride (8.9 g) diluted with toluene (20 mL) was slowly added dropwise at −78° C. and stirred at room temperature for a day. From the resulting reaction solution, the solvent was removed under reduced pressure, dichloromethane was added, filtration was performed, and the filtrate was removed by distillation under reduced pressure. Recrystallization was performed using toluene and hexane to obtain rac-[(diethylsilane-diyl)-bis(2-methyl-4-(4-tert-butyl-phenyl)indenyl)]zirconium dichloride (10.1 g, yield 34%, weight ratio of Rac:Meso=20:1) with high purity.

Step 2: Production of Supported Catalyst

A supported catalyst was produced in the same manner as in Step 2 of Comparative Preparation Example 1, except for using the transition metal compound prepared in Step 1.

Preparation Example 1

Step 1: Production of Transition Metal Compound

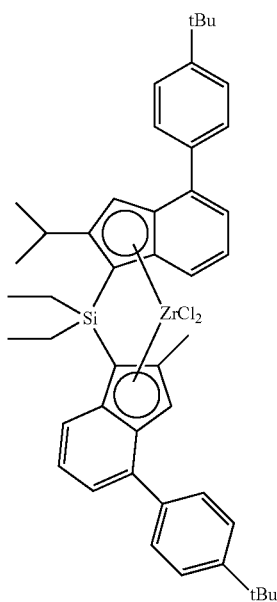

1a

The catalyst of the above chemical formula was produced by the following method.

To a 250 mL Schlenk flask, 7-tert-butylphenyl-2-isopropylindene (10.0 g, 34.4 mmol) was added and dried under reduced pressure. Under an argon atmosphere, anhydrous diethyl ether (172 mL) was added for dilution, and 2.5 M n-BuLi in hexane (36.2 mmol, 14.5 mL) was slowly added at −25° C. After stirring at 25° C. for 4 hours or more, Et$_2$SiCl$_2$ (34.4 mmol, 5.15 mL) was added to the reactant, and then stirred at 25° C. overnight After the solvent was all dried, hexane was added for dilution, a G4 size glass filter was used to filter out LiCl, and the filtrate was dried under reduced pressure. To another 250 mL Schlenk flask, 7-tert-butylphenyl-2-methylindene (9.04 g, 34.4 mmol) and CuCN (1.72 mmol, 0.15 g) were added and dried under reduced pressure. Under an argon atmosphere, anhydrous toluene (208 mL) and THE (20.4 mL) were added for dilution, 2.5 M n-BuLi in hexane (36.2 mmol, 14.5 mL) was slowly added at −25° C., and then stirred at 25° C. overnight. The above mono-Si solution was input to the flask. Thereafter, stirring was performed at 25° C. overnight, extraction was performed using water, and drying was performed to obtain a ligand compound.

To a 100 mL Schlenk flask, tert-butylamine (10.7 mmol, 1.1 mL) was added, anhydrous toluene (11.8 mL) and THF (0.86 mL) were added under an argon atmosphere for dilution, and 2.5 M n-BuLi in hexane (11.2 mmol, 4.48 mL) was slowly added at −25° C. After stirring at 25° C. for 2 hours or more, the solution was added to another Schlenk flask containing ZrCl$_4$.2THF (4.03 g, 10.7 mmol) and toluene (9.3 mL) at −25° C. and stirred at 25° C. for 2 hours or more. To another 100 mL Schlenk flask, the ligand compound (6.81 g, 10.7 mmol) prepared above was added and dried under reduced pressure. Under an argon atmosphere, anhydrous toluene (16.0 mL) and THF (1.60 mL) were added for dilution, and 2.5 M n-BuLi in hexane (22.5 mmol, 9.00 mL) was slowly added at −25° C. After stirring for 2 hours or more at 25° C., the previously synthesized Zr-tert-butylamide solution was added at −25° C. After stirring at 25° C. overnight, 1.0 M HCl in diethyl ether (23.5 mmol, 23.5 mL) was added at −25° C., and stirring was performed for about 1 hour until the temperature was 25° C. Filtration was performed with a G4 size glass filter, and the filtrate was dried under reduced pressure. The dried filtered product was added to hexane and stirred, impurities were washed out, and a racemic catalyst precursor was obtained by separation using dichloromethane and hexane.

Step 2: Production of Supported Catalyst

A supported catalyst was produced in the same manner as in Step 2 of Comparative Preparation Example 1, except for using the transition metal compound prepared in Step 1.

<Production of Homopolypropylene 1>

Comparative Example 1-1

Bulk-slurry polymerization of propylene was performed using continuous two loop reactors, in the presence of the silica-supported catalyst prepared in Comparative Preparation Example 1.

Here, triethylaluminum (TEAL) and hydrogen gas were input at contents of 50 ppm and 300 ppm using a pump, respectively, and the supported catalyst of Comparative Preparation Example 1 was used in a mud catalyst form in which the supported catalyst was mixed with oil and grease so that the content was 16.7 wt % for the bulk-slurry polymerization. Operation was performed at a reactor temperature of 70° C. and an output per hour of about 40 kg. A homopolypropylene was produced by a polymerization process, with a propylene input amount of 85 kg/h.

Comparative Example 1-2

Bulk-slurry polymerization of propylene was performed using continuous two loop reactors, in the presence of the silica-supported catalyst prepared in Comparative Preparation Example 2.

Here, triethylaluminum (TEAL) and hydrogen gas were input at contents of 50 ppm and 370 ppm using a pump, respectively, and the supported catalyst prepared in Comparative Preparation Example 2 was used in a mud catalyst form in which the supported catalyst was mixed with oil and grease so that the content was 16.7 wt % for the bulk-slurry polymerization. Operation was performed at a reactor temperature of 70° C. and an output per hour of about 37 kg. A homopolypropylene was produced by a polymerization process, with a propylene input amount of 84 kg/h.

Comparative Example 1-3

Bulk-slurry polymerization of propylene was performed using continuous two loop reactors, in the presence of the silica-supported catalyst prepared in Comparative Preparation Example 2.

Here, triethylaluminum (TEAL) and hydrogen gas were input at contents of 50 ppm and 550 ppm using a pump, respectively, and the silica-supported catalyst prepared in Comparative Preparation Example 2 was used in a mud catalyst form in which the silica-supported catalyst was mixed with oil and grease so that the content was 16.7 wt % for the bulk-slurry polymerization. Operation was performed at a reactor temperature of 70° C. and an output per hour of about 38 kg. A homopolypropylene was produced by a polymerization process, with a propylene input amount of 82 kg/h.

Comparative Example 1-4

Bulk-slurry polymerization of propylene was performed using continuous two loop reactors, in the presence of the silica-supported catalyst prepared in Comparative Preparation Example 3.

Here, triethylaluminum (TEAL) and hydrogen gas were input at contents of 50 ppm and 110 ppm using a pump, respectively, and the silica-supported catalyst prepared in Comparative Preparation Example 3 was used in a mud catalyst form in which the silica-supported catalyst was mixed with oil and grease so that the content was 16.7 wt % for the bulk-slurry polymerization. Operation was performed at a reactor temperature of 70° C. and an output per hour of about 39 kg. A homopolypropylene was produced by a polymerization process, with a propylene input amount of 83 kg/h.

Comparative Example 1-5

Bulk-slurry polymerization of propylene was performed using continuous two loop reactors, in the presence of the silica-supported catalyst prepared in Comparative Preparation Example 3.

Here, triethylaluminum (TEAL) and hydrogen gas were input at contents of 50 ppm and 900 ppm using a pump, respectively, and the silica-supported catalyst prepared in Comparative Preparation Example 3 was used in a mud catalyst form in which the silica-supported catalyst was mixed with oil and grease so that the content was 16.7 wt % for the bulk-slurry polymerization. Operation was performed at a reactor temperature of 70° C. and an output per hour of about 39 kg. A homopolypropylene was produced by a polymerization process, with a propylene input amount of 83 kg/h.

Example 1-1

Bulk-slurry polymerization of propylene was performed using continuous two loop reactors, in the presence of the silica-supported catalyst prepared in Preparation Example 1.

Here, triethylaluminum (TEAL) and hydrogen gas were input at contents of 50 ppm and 180 ppm using a pump, respectively, and the silica-supported catalyst prepared in Preparation Example 1 was used in a mud catalyst form in which the silica-supported catalyst was mixed with oil and grease so that the content was 16.7 wt % for the bulk-slurry polymerization. Operation was performed at a reactor temperature of 70° C. and an output per hour of about 40 kg. A homopolypropylene was produced by a polymerization process, with a propylene input amount of 81 kg/h.

Example 1-2

Bulk-slurry polymerization of propylene was performed using continuous two loop reactors, in the presence of the silica-supported metallocene catalyst prepared in Preparation Example 1.

Here, triethylaluminum (TEAL) and hydrogen gas were input at contents of 50 ppm and 70 ppm using a pump, respectively, and the silica-supported catalyst prepared in Preparation Example 1 was used in a mud catalyst form in which the silica-supported catalyst was mixed with oil and grease so that the content was 16.7 wt % for the bulk-slurry polymerization. Operation was performed at a reactor temperature of 70° C. and an output per hour of about 40 kg. A homopolypropylene was produced by a polymerization process, with a propylene input amount of 81 kg/h.

Example 1-3

A homopolypropylene was produced in the same manner as in Example 1-1, except for inputting hydrogen at a content of 210 ppm in Example 1-1.

Specifically, bulk-slurry polymerization of propylene was performed using continuous two loop reactors, in the presence of the silica-supported catalyst prepared in Preparation Example 1.

Here, triethylaluminum (TEAL) and hydrogen gas were input at contents of 50 ppm and 210 ppm using a pump, respectively, and the silica-supported catalyst prepared in Preparation Example 1 was used in a mud catalyst form in which the silica-supported catalyst was mixed with oil and grease so that the content was 16.7 wt % for the bulk-slurry polymerization. Operation was performed at a reactor temperature of 70° C. and an output per hour of about 40 kg. A homopolypropylene was produced by a polymerization process, with a propylene input amount of 81 kg/h.

Experimental Example 1

First, $^{13}C$ NMR analysis results of homopolypropylenes (PP) of Example 1-1 and Comparative Example 1-2 are shown in FIG. 1.

Referring to FIG. 1, in Example 1-1, a peak which is shown when four or more —$CH_2$— are continuously connected to a PP polymer chain was observed, from which the formation of LCB was confirmed. But the peak was not found in Comparative Example 1-2.

Experimental Example 2

In addition, activity of the catalysts used in each of the polymerization processes of Examples 1-1 to 1-3 and Comparative Examples 1-1 to 1-5 was evaluated, and the results are shown in the following Table 1.

Catalyst activity (kg PP/g cat-hr): calculated as a ratio of weight (kg PP) of a produced polymer per weight (g) of the used supported catalyst, based on a unit time (h).

In addition, for the polypropylenes prepared in Examples 1-1 to 1-3 and Comparative Examples 1-1 to 1-5, evaluation of physical properties was performed in the following method, and the results are shown in the following Table 1.

(1) Melt index (MI, 2.16 kg): measured at 230° C. under a load of 2.16 kg in accordance with ASTM D1238, and represented as a weight (g) of a melted polymer for 10 minutes.

(2) Weight average molecular weight (Mw) and molecular weight distribution (MWD, polydispersity index) of polymer: a weight average molecular weight (Mw) and a number average molecular weight (Mn) of a polymer were measured using gel transmission chromatography (GPC, manufactured by Waters), and a molecular weight distribution (Mw/Mn ratio) was calculated by dividing the weight average molecular weight by the number average molecular weight.

Specifically, measurement was performed using a Waters PL-GPC220 instrument using a column with a 300 mm length of Polymer Laboratories PLgel MIX-B. Here, an evaluation temperature was 160° C., 1,2,4-trichlorobenzene was used as a solvent, and a flow rate was 1 mL/min. A sample was prepared at a concentration of 10 mg/10 mL and supplied in an amount of 200 μL. A calibration curve formed using a polystyrene standard was used to derive Mw and Mn values. Nine types of the molecular weights (g/mol) of the polystyrene standard, which are 2000/10,000/30,000/70,000/200,000/700,000/2,000,000/4,000,000/10,000,000 were used.

Figure 2:
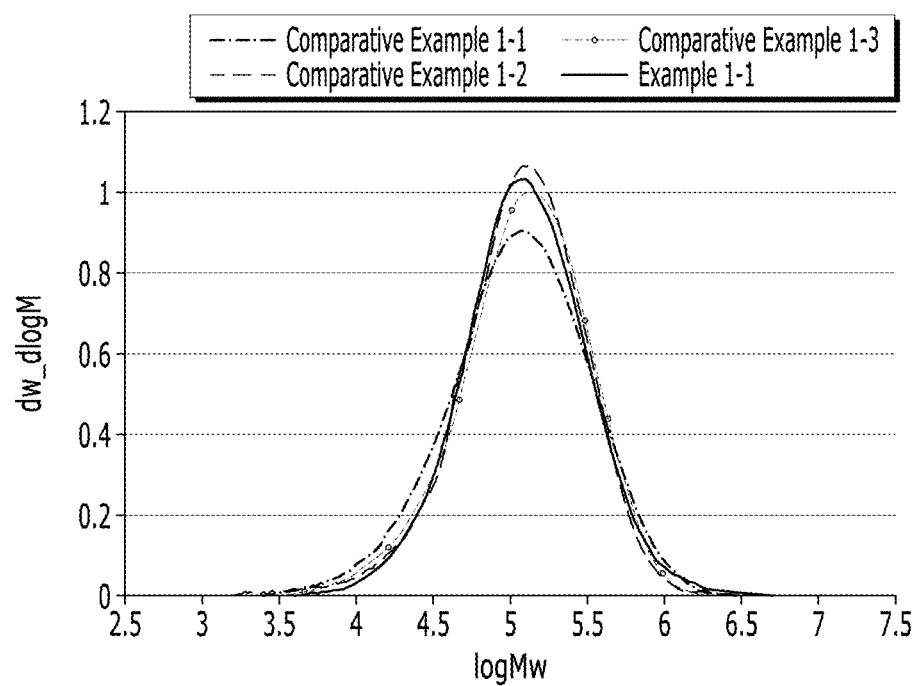
FIG. 2 is a graph showing molecular weight distributions of homopolypropylenes of Example 1-1 and Comparative Examples 1-1 to 1-3 measured by using GPC.

In addition, the results of measuring the molecular weight distribution of the homopolypropylenes of Example 1-1 and Comparative Examples 1-1 to 1-3 by GPC are shown in FIG. 2.

(3) Remaining stress ratio

For the homopolypropylenes produced in the examples and comparative examples, a sample was taken, respectively, a strain of 200% was applied at 235° C., and a change of remaining stress was measured for 10 minutes.

For measurement of the remaining stress, a Discovery Hybrid Rheometer (DHR) from TA Instruments was used.

The sample was sufficiently loaded between upper and lower plates having a diameter of 25 mm and melted at 235° C., and measurement was performed with a gap set at 1 mm.

Based on the data of the measured remaining stress, a remaining stress ratio (RS %) was calculated according to the following Calculation Formula 1. [Calculation Formula 1]

Remaining stress ratio(Y)=(RS$_1$/RS$_0$)*100

In Calculation Formula 1, RS$_0$ is remaining stress at 0.02 seconds (t$_0$) after a strain of 200% was applied to a synthetic resin sample at 235° C., and RS$_1$ is remaining stress at 1.00 seconds (t$_1$) after a strain of 200% was applied to a synthetic resin sample at 235° C.

Figure 4:
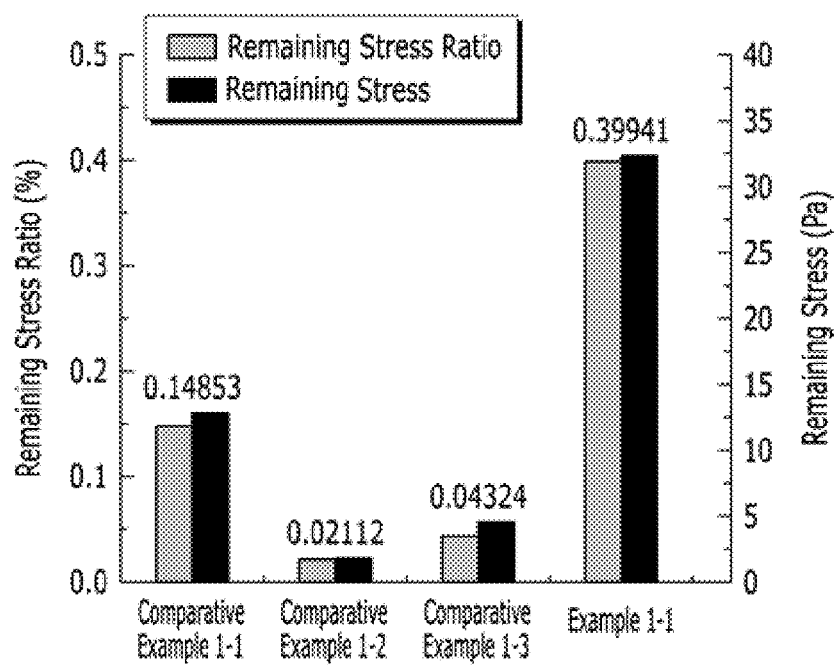
FIG. 4 is a graph showing remaining stresses and remaining stress ratios of homopolypropylenes of Example 1-1 and Comparative Examples 1-1 to 1-3.

In addition, the results of measuring remaining stress and remaining stress ratios for the homopolypropylene of Example 1-1 and Comparative Examples 1-1 to 1-3 are shown in FIG. 4.

(4) Complex viscosity depending on angular frequency: complex viscosities at angular frequencies of 1 rad/s and 100 rad/s were determined with a dynamic frequency sweep at 190° C. using an advanced rheometric expansion system (ARES). The dynamic frequency sweep was measured by using a 25 mm parallel plate in a disk shape.

Figure 3:
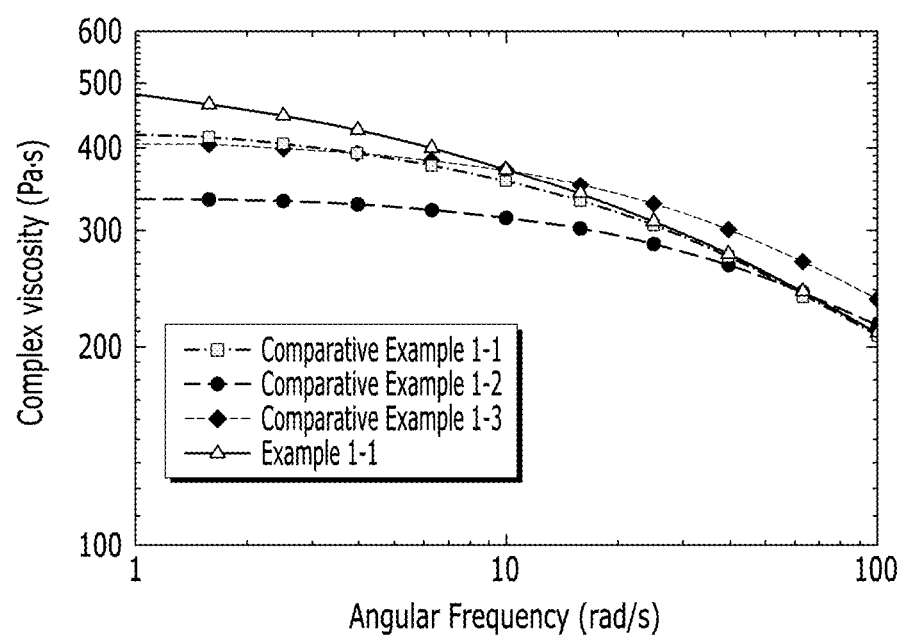
FIG. 3 is a graph showing complex viscosities at each of angular frequencies for homopolypropylenes of Example 1-1 and Comparative Examples 1-1 to 1-3.

The results of measuring a complex viscosity at each of angular frequencies for the homopolypropylenes of Example 1-1 and Comparative Examples 1-1 to 1-3, are shown in FIG. 3.

(5) Melting point (Tm, ° C.)

The temperature of the homopolypropylene to be measured was raised to 200° C., maintained for 5 minutes, lowered to 30° C., and then raised again, and the temperature of the highest peak of a DSC curve which was obtained by using a differential scanning calorimeter (DSC, manufactured by TA) was determined as a melting point. Herein, the scanning speeds in the temperature raising processes and temperature lowering processes were 10° C./min, respectively, and the melting point was determined from the result in a second temperature rising section.

(6) Xylene solubles (wt %): To each homopolypropylene sample, xylene was added, and pre-treatment was performed by heating at 135° C. for 1 hour and cooling for 30 minutes. Xylene was flowed into OmniSec equipment (FIPA from Viscotek) at a flow rate of 1 mL/min for 4 hours. After baselines of a refractive index (RI), a pressure across middle of bridge (DP), and an inlet pressure through bridge top to bottom (IP) were stabilized, a concentration of the pre-treated sample and the injected amount thereof were measured, and then a peak area was calculated.

TABLE 1

|  | Example | | | Comparative Example | | | | |
| --- | --- | --- | --- | --- | --- | --- | --- | --- |
|  | 1-1 | 1-2 | 1-3 | 1-1 | 1-2 | 1-3 | 1-4 | 1-5 |
| Catalyst activity (kg/g · cat) | 23.7 | 11.0 | 25.8 | 27.3 | 27.0 | 26.6 | 8.0 | 6.7 |
| MI (g/10 min) | 28.0 | 9 | 64 | 28.0 | 32.0 | 26.0 | 79 | 1463 |
| Mw (g/mol) | 171,000 | 250,000 | 130,000 | 169,000 | 160,000 | 166,000 | 201,000 | 53,000 |
| MWD | 2.30 | 2.30 | 2.30 | 2.87 | 2.40 | 2.40 | 2.59 | 2.50 |
| Complex viscosity (1 rad/s; Pa · s) | 494 | 540 | 450 | 420 | 336 | 408 | 472 | N.D |
| Complex viscosity (100 rad/s; Pa · s) | 210 | 253 | 192 | 207 | 223 | 243 | 248 | N.D |
| Remaining stress ratio (%) | 0.399 | 0.286 | 0.389 | 0.148 | 0.021 | 0.043 | 0.168 | N.D |
| Tm (° C.) | 157 | 157 | 157 | 152 | 153 | 153 | 153 | 153 |
| Xylene solubles (wt %) | 0.6 | 0.6 | 0.6 | 0.7 | 0.7 | 0.7 | 0.7 | 0.7 |

N.D.: not determinable

The catalyst used in Examples 1-1 to 1-3 exhibited excellent catalyst activity which was equivalent to or more than the catalyst activity of the comparative examples, and as a result, it was confirmed that the finally produced homopolypropylene showed a high remaining stress ratio, a high complex viscosity at 1 rad/s, a narrow molecular weight distribution, and a low complex viscosity at 100 rad/s based on a similar melt index, as compared with the comparative examples.

Accordingly, it was confirmed that the homopolypropylene of the examples showed excellent mechanical properties and excellent processability as a molded article in injection molding or the like, as compared with the comparative examples.

<Production of Homopolypropylene II>

Example 2-1

Bulk-slurry polymerization of propylene was performed using continuous two loop reactors, in the presence of the silica-supported catalyst prepared in Preparation Example 1.

Here, triethylaluminum (TEAL) and hydrogen gas were input at contents listed in Table 2 using a pump, respectively, and the supported catalyst prepared according to Preparation Example 1 was used in a mud catalyst form in which the supported catalyst was mixed with oil and grease so that the content was 30 wt % for the bulk-slurry polymerization. Operation was performed at a reactor temperature of 70° C. and an output per hour of about 40 kg.

Detailed reaction conditions for the polymerization process of Example 2-1 are as shown in the following Table 2, and the homopolypropylene was produced by the polymerization process.

Examples 2-2 to 2-3

A homopolypropylene was produced in the same manner as in Example 2-1, except for using the conditions listed in the following Table 2.

Comparative Example 2-1

Commercially available H7910® (manufactured by LG Chem.) was used as a Z/N homopolypropylene.

Comparative Example 2-2

A homopolypropylene was produced in the same manner as in Example 2-1, except for using the conditions listed in the following Table 2.

TABLE 2

|  | Example | | | Comparative Example | |
| --- | --- | --- | --- | --- | --- |
|  | 2-1 | 2-2 | 2-3 | 2-1 | 2-2 |
| Catalyst | Preparation Example 1 | Preparation Example 1 | Preparation Example 1 | Z/N catalyst | Comparative Preparation Example 4 |
| Catalyst amount (mg) | 30 | 30 | 30 | 30 | 30 |
| Pressure (kg/cm$^2$) | 35 | 35 | 35 | — | 35 |
| Propylene input amount (kg/h) | 40 | 40 | 40 | — | 40 |
| TEAL input amount (ppm) | 50 | 50 | 50 | — | 50 |
| Polymerization temperature (° C.) | 70 | 70 | 70 | — | 70 |
| Hydrogen input amount (ppm) | 300 | 500 | 700 | — | 2000 |

Experimental Example 3

For the homopolypropylenes produced in Examples 2-1 to 2-3 and Comparative Examples 2-1 and 2-2, evaluation of physical properties was performed in the same manner as in Experimental Example 2. The results are shown in the following Table 3.

TABLE 3

|  | Example | | | Comparative Example | |
| --- | --- | --- | --- | --- | --- |
|  | 2-1 | 2-2 | 2-3 | 2-1 | 2-2 |
| MI (g/10 min) | 200 | 390 | 800 | 950 | 1100 |
| Mw (g/mol) | 90,000 | 81,000 | 68,000 | 66,000 | 53,000 |
| MWD | 2.21 | 2.21 | 2.22 | 4.1 | 3.2 |
| Complex viscosity (1 rad/s; Pa · s) | 39.8 | 21.4 | 11.1 | 15.2 | N.D |
| Complex viscosity (100 rad/s; Pa · s) | 38.7 | 20.9 | 10.9 | 11.3 | N.D |
| Remaining stress ratio (%) | 0.04 | 0.04 | 0.03 | 0.15 | 0.03 |
| Tm (° C.) | 155 | 155 | 156 | 162 | 152 |
| Xylene solubles (wt %) | 0.8 | 0.7 | 0.6 | 2.2 | 0.7 |

As a result of experiments, the homopolypropylenes of Examples 2-1 to 2-3 which were produced by a method according to the present invention showed high MI of 200 g/10 min or more, and the MI was increased with the increase of a hydrogen input amount. In addition, while showing high MI as such, the homopolypropylenes showed a narrow MWD of 2.3 or less and a low remaining stress ratio of 0.1% or less, as compared with the comparative examples, and particularly, showed significantly decreased xylene solubles and a narrow molecular weight distribution, as compared with the homopolypropylene of Comparative Example 2-1 which was produced using a Ziegler-Natta catalyst.

Meanwhile, in the case of Comparative Example 2-2, a hydrogen input amount was different from a hydrogen input amount required for production of a polymer having an equivalent MI, due to a difference in hydrogen reactivity by a difference in a catalyst structure, but the molecular weight distribution was increased as compared with the examples.

Experimental Example 4

<Production of Non-Woven Fabric>

A melt blowing process was performed using a resin composition including homopolypropylenes according to Examples 2-1 to 2-3 and Comparative Examples 2-1 and 2-2, thereby producing a spunbond non-woven fabric.

Specifically, a 25 mm twin-screw extruder was used to produce a masterbatch including each of homopolypropylenes according to Examples 2-1 to 2-3 and Comparative Examples 2-1 and 2-2 and 2000 ppm of Irganox 1010™ and 2000 ppm of Irgafos 168™ as an antioxidant, which was then pelletized.

Subsequently, the masterbatch pellet was extruded into an extra fine fiber web by a process similar to description of the literature [Report No. 4364 of the Naval Research Laboratories, published May 25, 1954 entitled "Manufacture of Superfine Organic Fibers" by Wente, Van. A., Boone, E. L., and Fluharty, C. D.], except that a 31 mm Brabender conical twin screw extruder was used to supply the melted masterbatch composition to a melt pump (65 rpm) and then to a 25 cm wide melt blowing die having outlets (10 outlets/cm) and an outlet diameter of 381 μm.

A melting temperature was 235° C., a screw speed was 120 rpm, the die was maintained at 235° C., primary air temperature and pressure were 300° C. and 60 kPa (8.7 psi), respectively, a polymer treatment speed was 5.44 kg/h, and a collector/die distance was 15.2 cm.

<Evaluation of Physical Properties of Non-Woven Fabric>

For each of the spunbond non-woven fabrics produced using the homopolypropylenes according to Examples 2-1 to 2-3 and Comparative Examples 2-1 and 2-2, evaluation of physical properties was performed as described below, and the results are shown in the following Table 4.

(1) Basis weight (gsm) of non-woven fabric

A weight of the produced non-woven fabric was measured, and a non-woven fabric weight per unit area was calculated.

(2) Processability of non-woven fabric

It was confirmed whether single yarn of the fiber occurred in production of a non-woven fabric, and processability of the non-woven fabric was evaluated according to the following criteria.

<Evaluation Criteria>

Good: a single yarn occurrence rate of fiber of 10% or less, that is, a time during which fiber is not produced due to single yarn occurrence is 2.4 hours or less, based on a fiber production time of 24 hours.

Poor: a single yarn occurrence rate of fiber of more than 10%, that is, a time during which fiber is not produced due to single yarn occurrence is more than 2.4 hours, based on a fiber production time of 24 hours.

(3) Strength of non-woven fabric

According to a method of the American Society for Testing and Materials (ASTM) D 5035:2011 (2015), strength (N/5 cm) in a machine direction (MD) and in a cross direction (CD) of a non-woven fabric was measured by a 5 cm wide cut-strip method.

(4) Roughness of non-woven fabric

Roughness of a non-woven fabric was measured by evaluation of 10 blind panels, and was evaluated according to the following criteria:

<Evaluation Criteria>

◎◎: excellent when 9 or more panels evaluated that texture of a non-woven fabric was rough.

◎○: excellent when 7 or 8 panels evaluated that texture of a non-woven fabric was rough.

◎: excellent when 5 or 6 panels evaluated that texture of a non-woven fabric was rough.

○: good when 4 panels evaluated that texture of a non-woven fabric was rough.

Δ: normal when 2 or 3 panels evaluated that texture of a non-woven fabric was rough X: poor when 1 or less panel evaluated that texture of a non-woven fabric was rough

TABLE 4

|  | Example | | | Comparative Example | |
| --- | --- | --- | --- | --- | --- |
|  | 2-1 | 2-2 | 2-3 | 2-1 | 2-2 |
| Non-woven fabric basis weight (gsm) | 38 | 38 | 37 | 40 | 38 |
| Processability | Good | Good | Good | Poor | Good |
| Strength (MD/CD, N/5 cm) | 33/23 | 30/21 | 26/18 | 10/8 | 15/11 |
| Roughness | ◎◎ | ◎◎ | ◎◎ | Δ | ◎ |

According to an embodiment of the present invention, the non-woven fabric produced using the homopolypropylenes of Examples 2-1 to 2-3 in which MI, MWD, xylene solubles, and remaining stress ratio were all optimized showed high strength and roughness together with excellent processability. Furthermore, it is recognized from the characteristics of high roughness of the homopolypropylenes according to Examples 2-1 to 2-3 that it is possible to produce a non-woven fabric for washing requiring a high roughness characteristic, with only primary processing without blending with an additive.

Meanwhile, in Comparative Example 2-1 in which production was performed using a Ziegler-Natta catalyst, processability was poor, and strength and roughness characteristics were greatly deteriorated as compared with Examples 2-1 to 2-3. It is recognized from a particularly low roughness characteristic that blending with an additive for increasing a roughness characteristic and secondary processing are essential for producing a non-woven fabric for washing using the homopolypropylene produced according to Comparative Example 2-1.

In addition, in the case of Comparative Example 2-2 using a compound having a different structure as a catalyst active material, deterioration of strength occurred due to a broad molecular weight distribution.

From the results, it is confirmed that for implementing a homopolypropylene satisfying the physical property requirements according to the present invention, it is necessary to use the transition metal compound having the structure of Chemical Formula 1 and control a hydrogen input amount.

The invention claimed is:

1. A homopolypropylene satisfying the following conditions:
   i) a molecular weight distribution of less than 2.4;
   ii) a melt index (measured at 230° C. under a load of 2.16 kg in accordance with ASTM D1238) of 5 to 3000 g/10 min;
   iii) a remaining stress ratio of 0.5% or less; and
   iv) a complex viscosity of 5 to 600 Pa·s at an angular frequency of 1 rad/s and a complex viscosity of 5 to 300 Pa·s at an angular frequency of 100 rad/s.

2. The homopolypropylene of claim 1, wherein the melt index (measured at 230° C. under a load of 2.16 kg in accordance with ASTM D1238) is 5 g/10 min or more and less than 200 g/10 min, and the remaining stress ratio is 0.2 to 0.5%.

3. The homopolypropylene of claim 1, wherein the melt index (measured at 230° C. under a load of 2.16 kg in accordance with ASTM D1238) is 200 to 3000 g/10 min, and the remaining stress ratio is 0.001 to 0.1%.

4. The homopolypropylene of claim 1, wherein the melt index (measured at 230° C. under a load of 2.16 kg in accordance with ASTM D1238) is 5 to 70 g/10 min, the complex viscosity at an angular frequency of 1 rad/s is 430 to 600 Pa·s, and the complex viscosity at an angular frequency of 100 rad/s is 180 to 300 Pa·s.

5. The homopolypropylene of claim 1, wherein the melt index (measured at 230° C. under a load of 2.16 kg in accordance with ASTM D1238) is more than 70 g/10 min and 3000 g/10 min or less, the complex viscosity at an angular frequency 1 rad/s is 5 to 200 Pa·s, and the complex viscosity at an angular frequency 100 rad/s is 5 to 150 Pa·s.

6. The homopolypropylene of claim 1, wherein a weight average molecular weight is 30,000 to 300,000 g/mol.

7. The homopolypropylene of claim 1, wherein a melting point (Tm) is 155 to 160° C.

8. The homopolypropylene of claim 1, wherein a xylene soluble content is 0.1 to 1.0 wt %.

9. The homopolypropylene of claim 1, wherein the molecular weight distribution is 1.5 to 2.35.

10. The homopolypropylene according to claim 1, prepared by
    polymerizing propylene monomer in the presence of a supported catalyst comprising a silica carrier and compound of the following Chemical Formula 1 and a cocatalyst supported on the silica carrier:

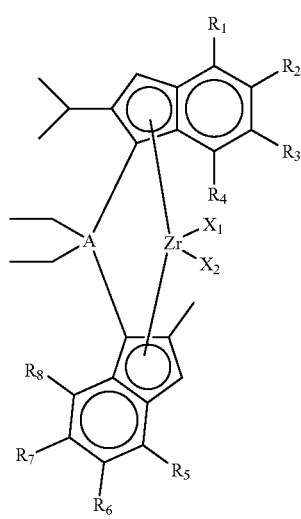

[Chemical Formula 1]

wherein, $X_1$ and $X_2$ are each independently a halogen, $R_1$ and $R_5$ are each independently a $C_{6-20}$ aryl substituted with a $C_{1-20}$ alkyl, $R_2$ to $R_4$ and $R_6$ to $R_8$ are each independently hydrogen, a halogen, a $C_{1-20}$ alkyl, a $C_{2-20}$-alkenyl, a $C_{1-20}$ alkylsilyl, a $C_{1-20}$ silylalkyl, a $C_{6-20}$ alkoxysilyl, a $C_{1-20}$ ether, a $C_{1-20}$ silylether, a $C_{1-20}$ alkoxy, a $C_{6-20}$ aryl, a $C_{7-20}$ alkylaryl, or a $C_{7-20}$ arylalkyl, and A is carbon, silicon, or germanium.

11. A method for preparing the homopolypropylene of claim 1, comprising polymerizing propylene monomer in the presence of a supported catalyst comprising a silica carrier and a compound of the following Chemical Formula 1 and a cocatalyst supported on the silica carrier:

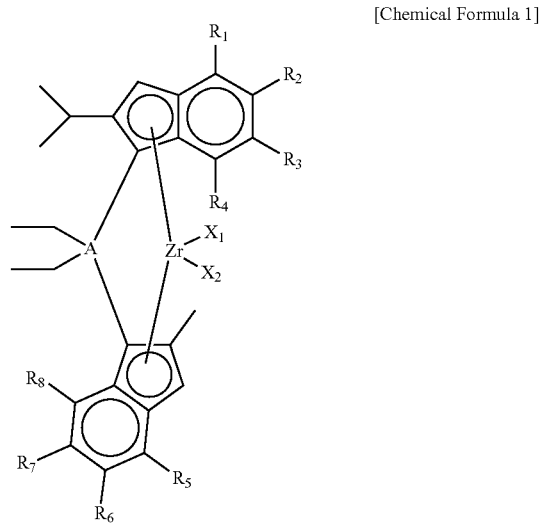

[Chemical Formula 1]

wherein, $X_1$ and $X_2$ are each independently a halogen, $R_1$ and $R_5$ are each independently a $C_{6-20}$ aryl substituted with a $C_{1-20}$ alkyl, $R_2$ to $R_4$ and $R_6$ to $R_8$ are each independently hydrogen, a halogen, a $C_{1-20}$ alkyl, a $C_{2-20}$ alkenyl, a $C_{1-20}$ alkylsilyl, a $C_{1-20}$ silylalkyl, a $C_{1-20}$ alkoxysilyl, a $C_{1-20}$ ether, a $C_{1-20}$ silylether, a $C_{1-20}$ alkoxy, a $C_{6-20}$ aryl, a $C_{7-20}$ alkylaryl, or a $C_{7-20}$ arylalkyl, and A is carbon, silicon, or germanium.

12. The method of claim 11, wherein $R_1$ and $R_5$ are each independently a phenyl substituted with a branched $C_{3-6}$ alkyl.

13. The method of claim 11, wherein $R_1$ and $R_5$ are each tert-butyl phenyl.

14. The method of claim 11, wherein A is silicon.

15. The method of claim 11, wherein the compound of Chemical Formula 1 is represented by the following Chemical Formula 1a:

[Chemical Formula 1a]

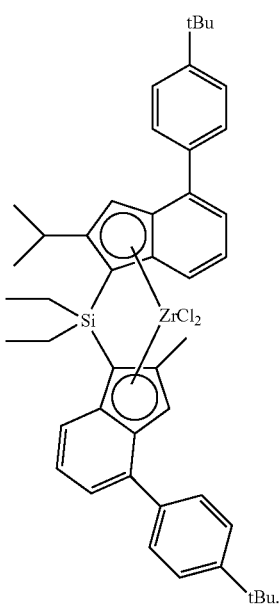

16. The method of claim 11, wherein the cocatalyst comprises a compound represented by the following Chemical Formula 2:

$$-[Al\ R_{11}-O]_m-$$ [Chemical Formula 2]

wherein, each $R_{11}$ is identical to or different from each other, and is each independently a halogen, a $C_{1-20}$ hydrocarbon, or a $C_{1-20}$ hydrocarbon substituted with a halogen, and m is an integer of 2 or more.

17. The method of claim 11, wherein the supported catalyst further comprises an antistatic agent.

18. The method of claim 11, wherein hydrogen is further added in an A amount of 50 to 2500 ppm based on a total weight of propylene during polymerization.

19. A molded article comprising the homopolypropylene according to claim 1.

20. A non-woven fabric comprising the homopolypropylene according to claim 1.

* * * * *